United States Patent
Rom et al.

(10) Patent No.: US 10,957,211 B2
(45) Date of Patent: *Mar. 23, 2021

(54) METHOD AND APPARATUS FOR TRAINING A USER OF A SOFTWARE APPLICATION

(71) Applicant: STEELSERIES ApS, Frederiksberg (DK)

(72) Inventors: Kim Rom, San Francisco, CA (US); Jeffrey Nicholas Mahlmeister, Glenview, IL (US); Jacob Wolff-Petersen, Richmond (GB); Bruce Hawver, Hawthorn Woods, IL (US); Francis Arnold Grever, Palatine, IL (US); Tino Soelberg, Chicago, IL (US); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 44 days.

This patent is subject to a terminal disclaimer.

(21) Appl. No.: 16/540,487

(22) Filed: Aug. 14, 2019

(65) Prior Publication Data

US 2019/0371194 A1    Dec. 5, 2019

Related U.S. Application Data

(63) Continuation of application No. 15/875,444, filed on Jan. 19, 2018, now Pat. No. 10,424,213, which is a continuation of application No. 13/788,835, filed on Mar. 7, 2013, now Pat. No. 9,911,350.

(51) Int. Cl.
G09B 5/06 (2006.01)
A63F 13/42 (2014.01)
G09B 19/22 (2006.01)

(52) U.S. Cl.
CPC ............... *G09B 5/06* (2013.01); *A63F 13/42* (2014.09); *G09B 19/22* (2013.01)

(58) Field of Classification Search
CPC ........................... A63F 13/67; A63F 13/5375
See application file for complete search history.

(56) References Cited

U.S. PATENT DOCUMENTS

| | | | |
|---|---|---|---|
| 7,925,797 B2 | 4/2011 | Wolff-Peterson | |
| 8,108,566 B2 | 1/2012 | Wolff-Peterson | |
| 8,281,046 B2 | 10/2012 | Wolff-Peterson | |
| 8,341,305 B2 | 12/2012 | Wolff-Peterson | |
| 8,721,451 B2 | 5/2014 | Zalewski | |
| 2008/0119286 A1 | 5/2008 | Brunstetter et al. | |

(Continued)

OTHER PUBLICATIONS http://us.battle.net/en/, 2 pgs. (Printed Dec. 29, 2011).
http://www.esl.eu/, 2 pgs. (Printed Dec. 29, 2011).
http://www.hltv.org/, 2 pgs (Printed Dec. 29, 2011).

*Primary Examiner* — Robert T Clarke, Jr.
(74) *Attorney, Agent, or Firm* — Guntin & Gust, PLC; Dana B. Lemoine

(57) ABSTRACT

A method that incorporates teachings of the subject disclosure may include, for example, detecting a game stimulus signal generated by a first gaming accessory device, determining a first game action result based on the game stimulus signal, analyzing the first game action result to provide a first coaching message to achieve a desired result, and presenting the coaching message. Additional embodiments are disclosed.

20 Claims, 21 Drawing Sheets

(56) References Cited

U.S. PATENT DOCUMENTS

| | | |
|---|---|---|
| 2008/0148165 A1* | 6/2008 | Zalewski .............. A63F 13/211 |
| | | 715/764 |
| 2008/0268943 A1 | 10/2008 | Jacob |
| 2012/0311458 A1 | 12/2012 | Wolff-Petersen et al. |
| 2013/0045799 A1 | 2/2013 | Soelberg et al. |
| 2013/0079154 A1 | 3/2013 | Wolff-Petersen |
| 2018/0144650 A1 | 5/2018 | Rom et al. |

* cited by examiner

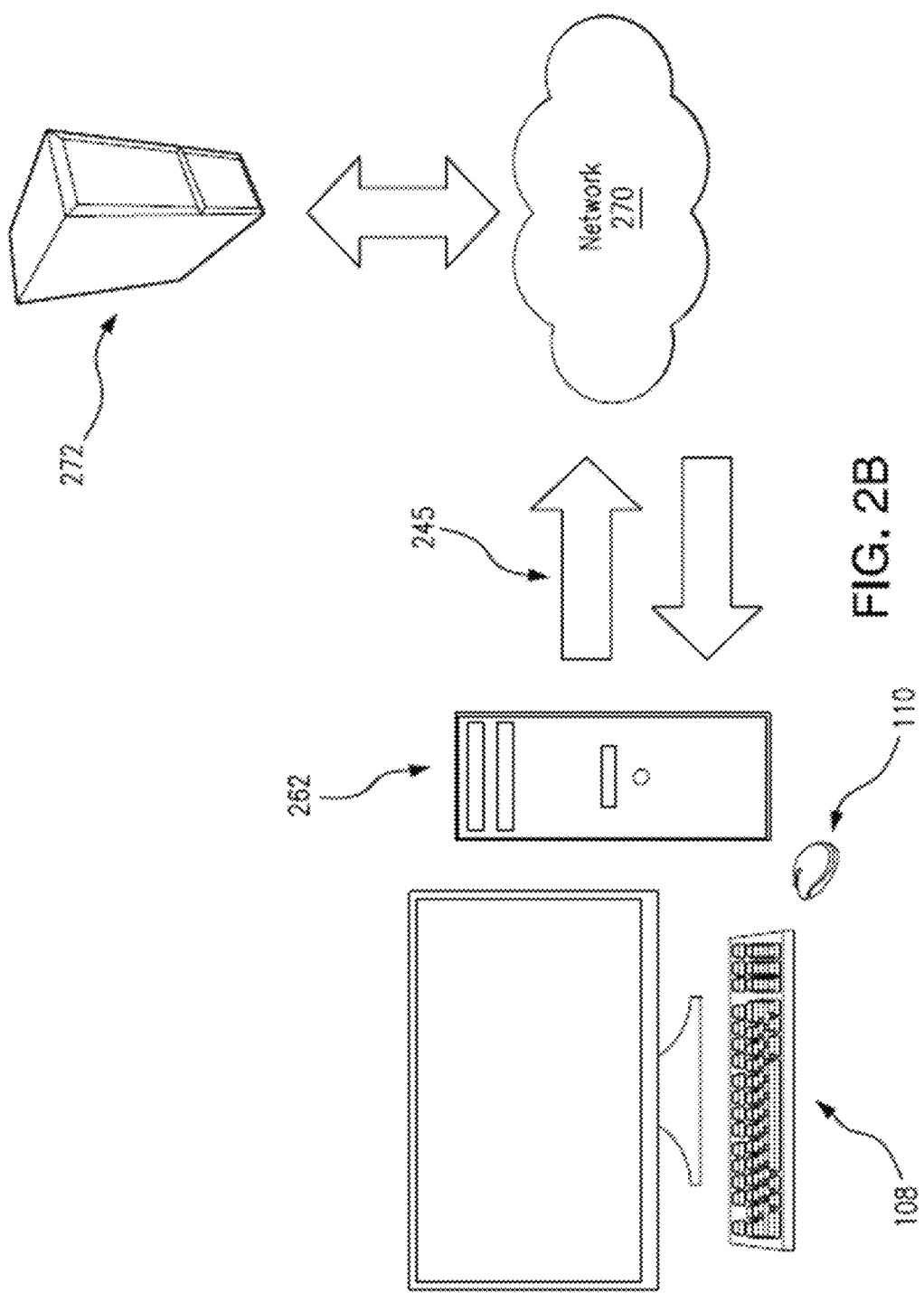

METHOD AND APPARATUS FOR TRAINING A USER OF A SOFTWARE APPLICATION

CROSS-REFERENCE TO RELATED APPLICATION(S)

This application is a continuation of U.S. patent application Ser. No. 15/875,444, filed Jan. 19, 2018, which is a continuation of U.S. patent application Ser. No. 13/788,835, filed Mar. 7, 2013, issued as U.S. Pat. No. 9,911,350 on Mar. 6, 2018. All sections of the aforementioned applications and patents are incorporated herein by reference in their entirety

FIELD OF THE DISCLOSURE

The subject disclosure relates generally to a method and apparatus for training game players.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories during a game. Efficient management and utilization of these accessories can frequently impact a gamer's ability to compete.

BRIEF DESCRIPTION OF THE DRAWINGS

Reference will now be made to the accompanying drawings, which are not necessarily drawn to scale, and wherein:

FIGS. 2A and 2B depict illustrative embodiments for communicatively coupling a gaming controller to a computing device via a network;

DETAILED DESCRIPTION

The subject disclosure describes, among other things, illustrative embodiments for training game players. Other embodiments are contemplated by the subject disclosure.

One embodiment of the subject disclosure can entail a method for presenting, by a computing device executing a video game software application, one or more images representing one or more gaming venue states of a video game generated by the video game software application, detecting, by the computing device, a first game stimulus signal from a first gaming accessory device, generating, by the computing device, a first game action result based on a determination whether the first game stimulus signal causes a first desired result, retrieving, by the computing device, first data relating to the first game action result, analyzing, by the computing device, the first data to provide a first coaching message in accordance with the first desired result, and presenting, by the computing device, the first coaching message.

One embodiment of the subject disclosure can entail a computing device including memory to store computer instructions, and a controller coupled to the memory. Responsive to executing the computer instructions, the controller performs operations including executing a video game software application, presenting one or more images representing one or more gaming venue states generated from the video game software application, detecting a first game stimulus signal from a first gaming accessory device, generating a first game action result according to the first game stimulus signal, analyzing the first game action result responsive to determining that the game action result did not achieve a desired result, generating a first coaching message to assist a first gamer in achieving the desired result, and presenting the first coaching message.

One embodiment of the subject disclosure can entail a computer-readable storage device including instructions. Responsive to executing the instructions by a processor, the processor can perform operations including detecting a game stimulus signal generated by a first gaming accessory device, determining a first game action result based on the game stimulus signal, analyzing the first game action result to provide a first coaching message to achieve a desired result, and presenting the coaching message.

Figure 1:
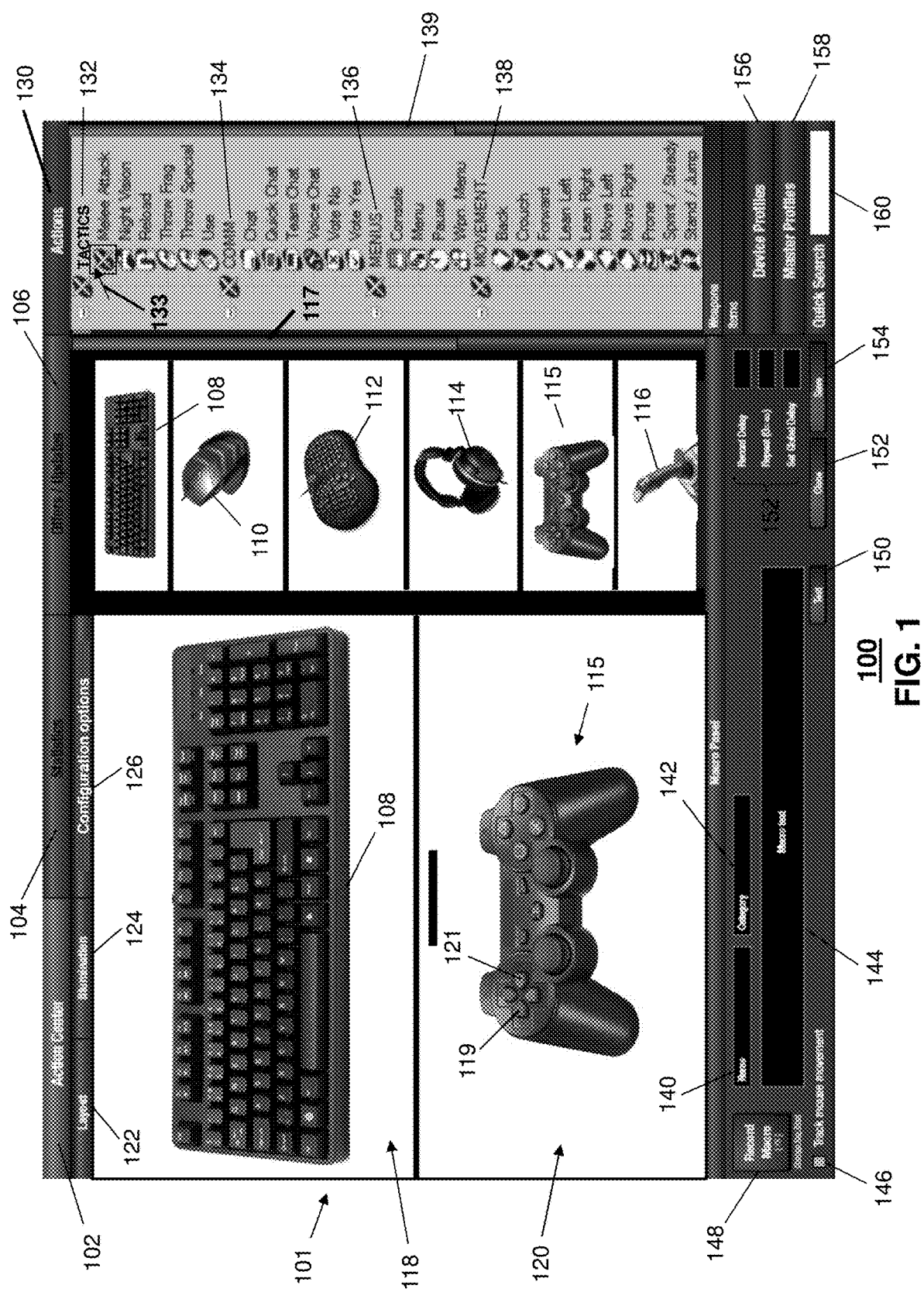
FIG. 1 depicts an illustrative embodiment of a Graphical User Interface (GUI) generated by an Accessory Management Software (AMS) application according to the subject disclosure.

FIG. 1 depicts an illustrative embodiment 100 of a Graphical User Interface (GUI) 101 generated by an Accessory Management Software (AMS) application according to the subject disclosure. The gamer can interact with one or more of the gaming accessories via the GUI. The AMS application can be executed by a computing device such as a desktop computer, a laptop computer, a server, a mainframe computer, a gaming console, a gaming accessory, or combinations or combinations of portions thereof. The AMS application can also be executed by portable computing devices (with computing resources) such as a cellular phone, a smartphone, a personal digital assistant, a tablet, or a media player (such as an iPOD™). It is contemplated that the AMS application can be executed by any device with suitable computing resources.

Figure 2A:
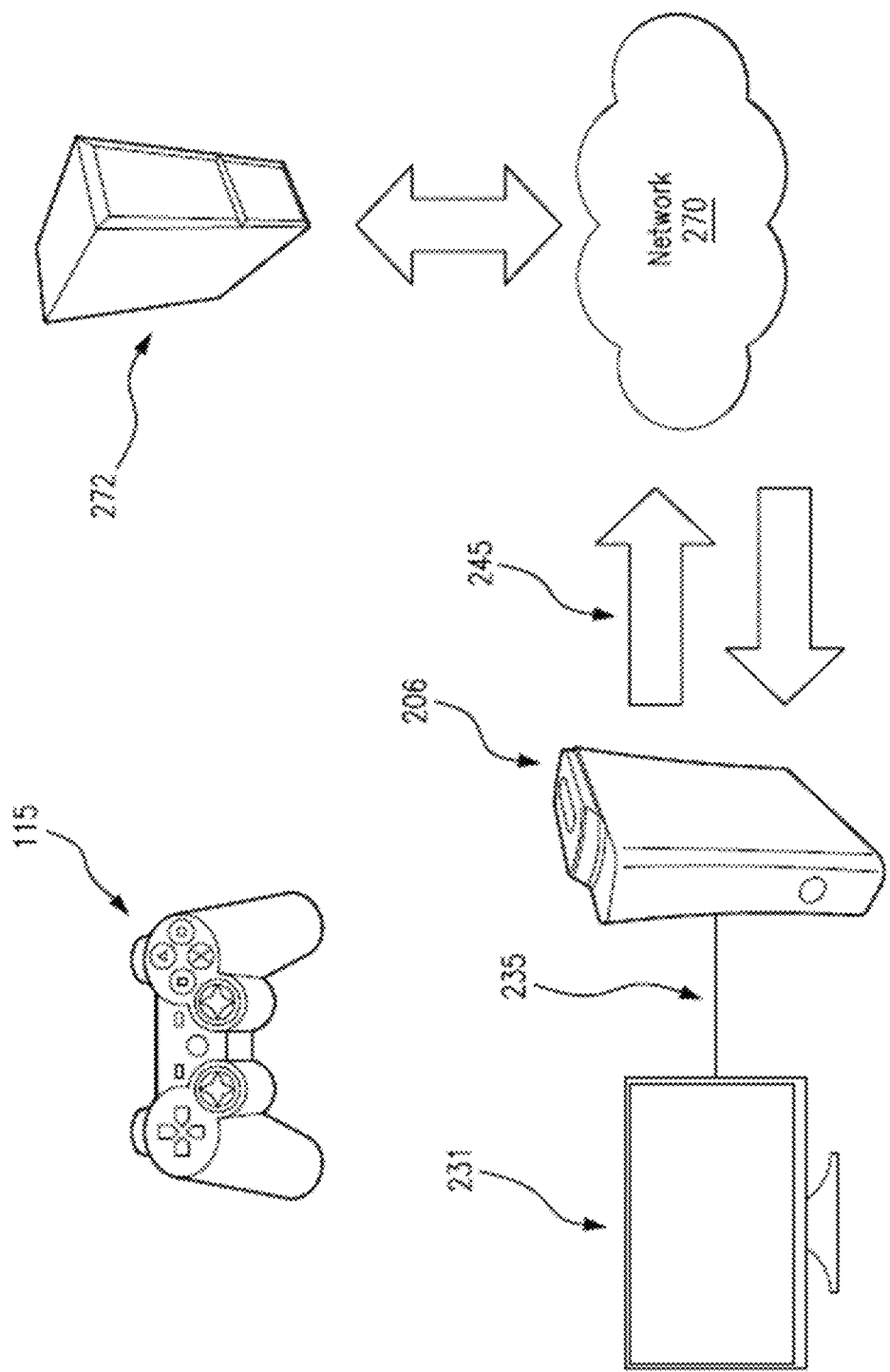

FIG. 2A schematically depicts a gaming controller 115 which can be used by a gamer, according to an embodiment of the subject disclosure. In this embodiment, gaming controller 115 and gaming console 206 have an integrated wireless interface for wireless communications therebetween (e.g., WiFi, Bluetooth, ZigBee, or a proprietary protocol). The gaming console 206 can also be coupled to network 270 via communication link 245, such as a WiFi link, to the internet. The gaming console 206 can be, for example, an Xbox™, a PS3™, a Wii™, or another suitable gaming console device. Video information is displayed to the gamer on display device 231, which in this illustration is coupled to gaming console 206 by a wired connection 235, but can be replaced, if desirable, by a wireless interface (e.g., wireless HDMI. Display device 231 may be a television as illustrated or a touch screen comprising both an input device and an output device. Alternatively, the gaming controller 115 can be tethered to a computing device such as the gaming console by a cable (e.g., USB cable) to provide a means of communication less susceptible to electromagnetic interference or other sources of wireless interference.

FIG. 2B depicts an alternative embodiment to FIG. 2A in which a desktop computer 262 is used in place of the gaming console 206. In one embodiment, the desktop computer 262 can be configured to execute a gaming client (i.e., a software application) acting in cooperation with an on-line gaming server 272 accessible by the desktop computer 262 via the network 270 (e.g., World of Warcraft™). In another embodiment, the desktop computer 262 can be configured to execute a localized gaming software application without accessing the on-line gaming server 272.

The gaming accessory used with the desktop computer 262 can be a keyboard 108, mouse 110, or another suitable gaming accessory device. In the present context, an accessory can represent any type of device which can be communicatively coupled to the computing device (or an integral part of the computing device) and which can control aspects of an operating system (OS) and/or a software application operating in the computing device. An accessory can represent for example a keyboard, a touch screen display, a gaming pad, a gaming controller, a mouse, a joystick, a microphone, or a headset with a microphone—just to mention a few.

It is understood that the devices shown in FIGS. 1, 2A and 2B are mere illustrations of possible gaming configurations. The subject disclosure is applicable to other gaming configurations and is thereby not limited by those described in FIGS. 1, 2A and 2B.

Figure 3:
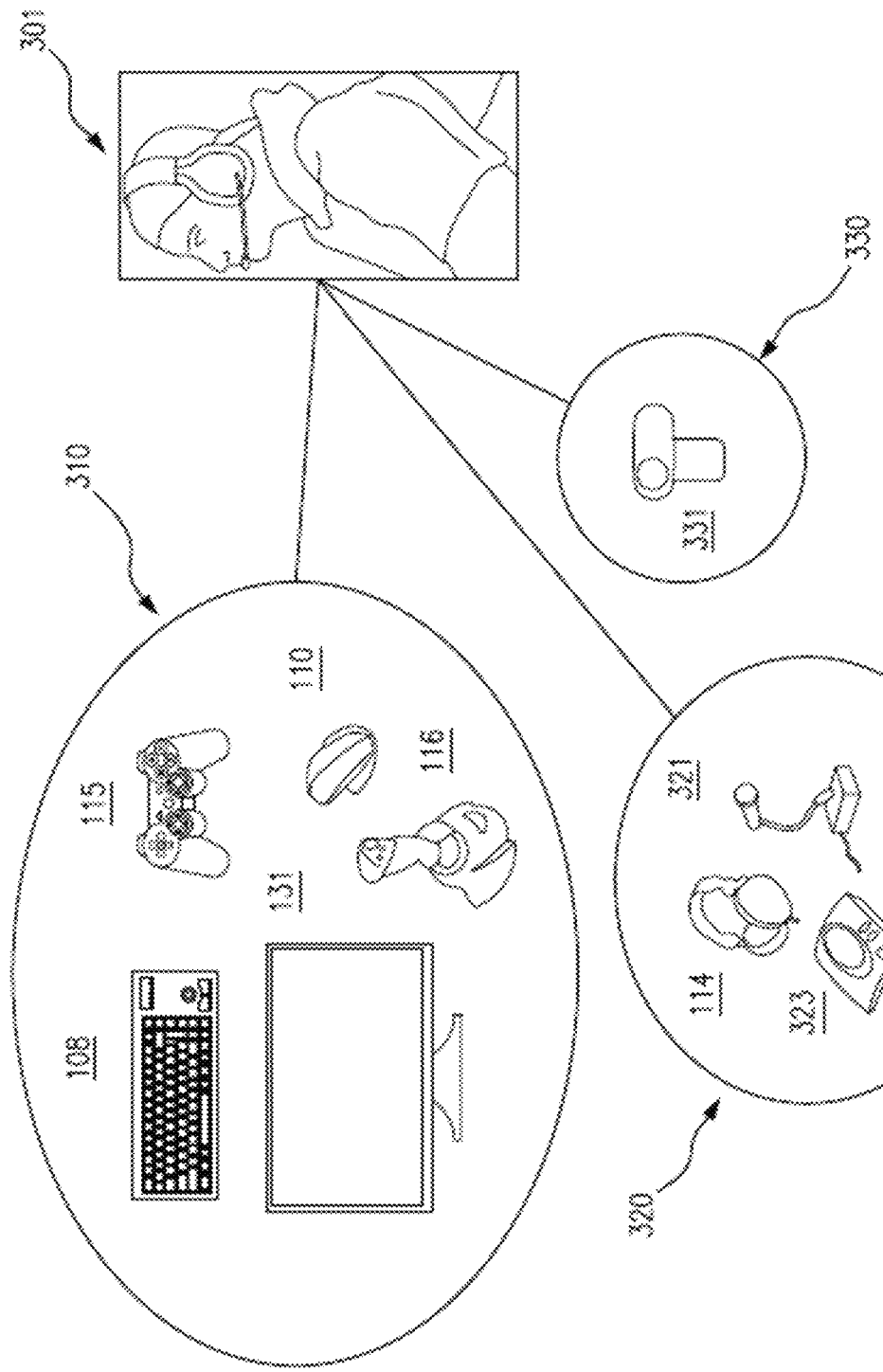
FIG. 3 schematically illustrates gaming accessories that can be used by a gamer interacting with a gaming engine.

FIG. 3 illustrates gaming accessory devices with which a gamer 301 can interact. Touch-sensitive devices 310 can include a gaming controller 115, mouse 110, keyboard 108, touchscreen display 231, and joystick 116. Audio devices 320 can include headphones 114, microphone 321, and speakerphone 323. Imaging devices 330 can include webcam 331. These accessory devices can provide tactile, audio, and/or visual stimuli to a gamer, receive responses from the gamer to thereby generate stimuli which can be interpreted by a gaming software application, or both.

The accessories can be coupled to the computing device by a tethered interface (e.g., USB cable), a wireless interface (e.g., Bluetooth or Wireless Fidelity—WiFi), or combinations thereof.

The term "gaming system," as used herein, refers to the combination of computing hardware and software that delivers a gaming experience. The software applications that present and manage the gaming experience are collectively referred to herein as a "gaming engine." The gaming engine generally includes the AMS for managing and augmenting usage of the various accessories, and an Application Program Interface (API) for receiving feedback from a computing device which is a subset of the gaming system that executes a gaming software application. The computing device can be a gaming console, a server, a local computer, a portable communication device, combinations thereof, or other devices with suitable processing resources.

Figure 4:
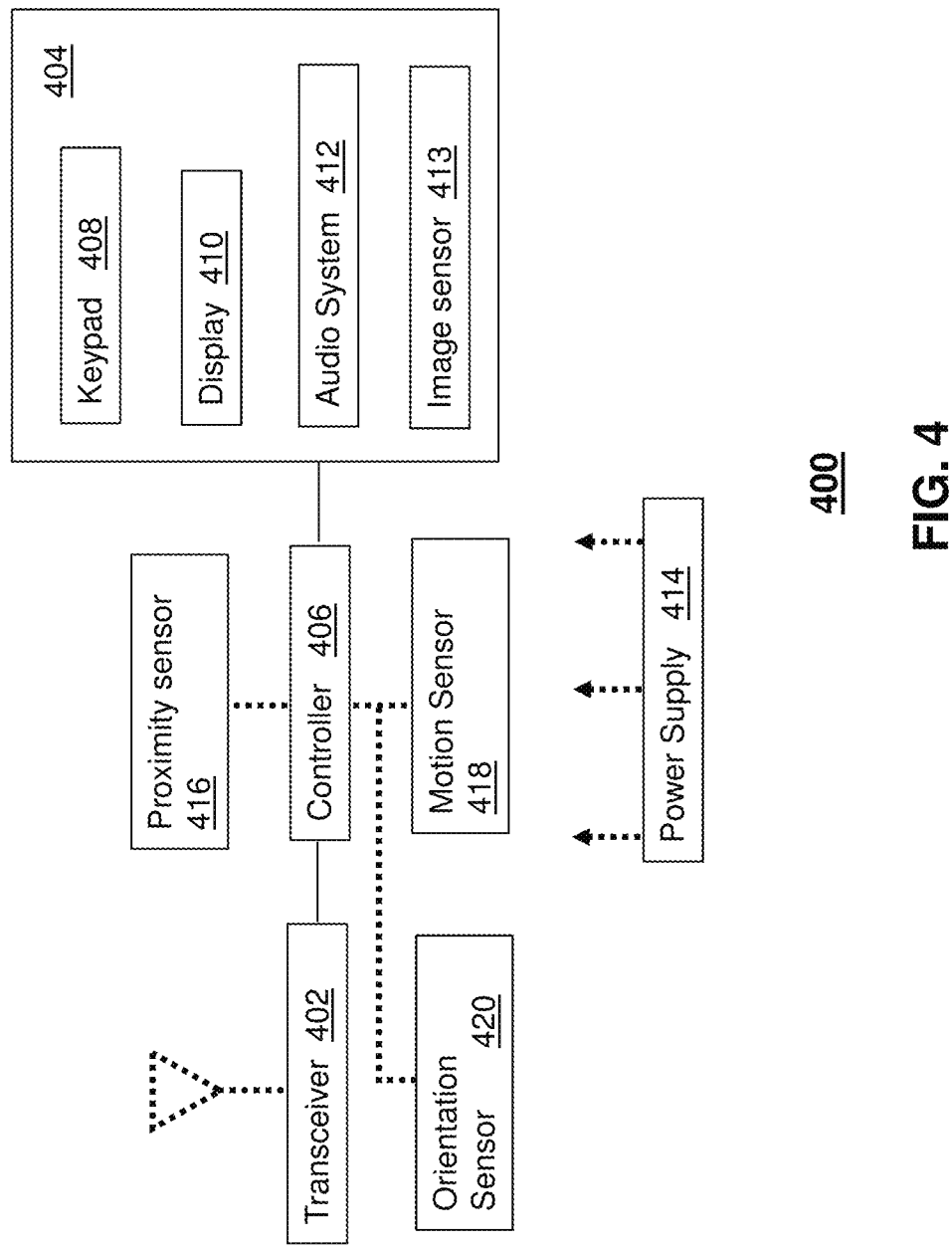
FIG. 4 depicts an illustrative embodiment of a communication device.
Figure 5:
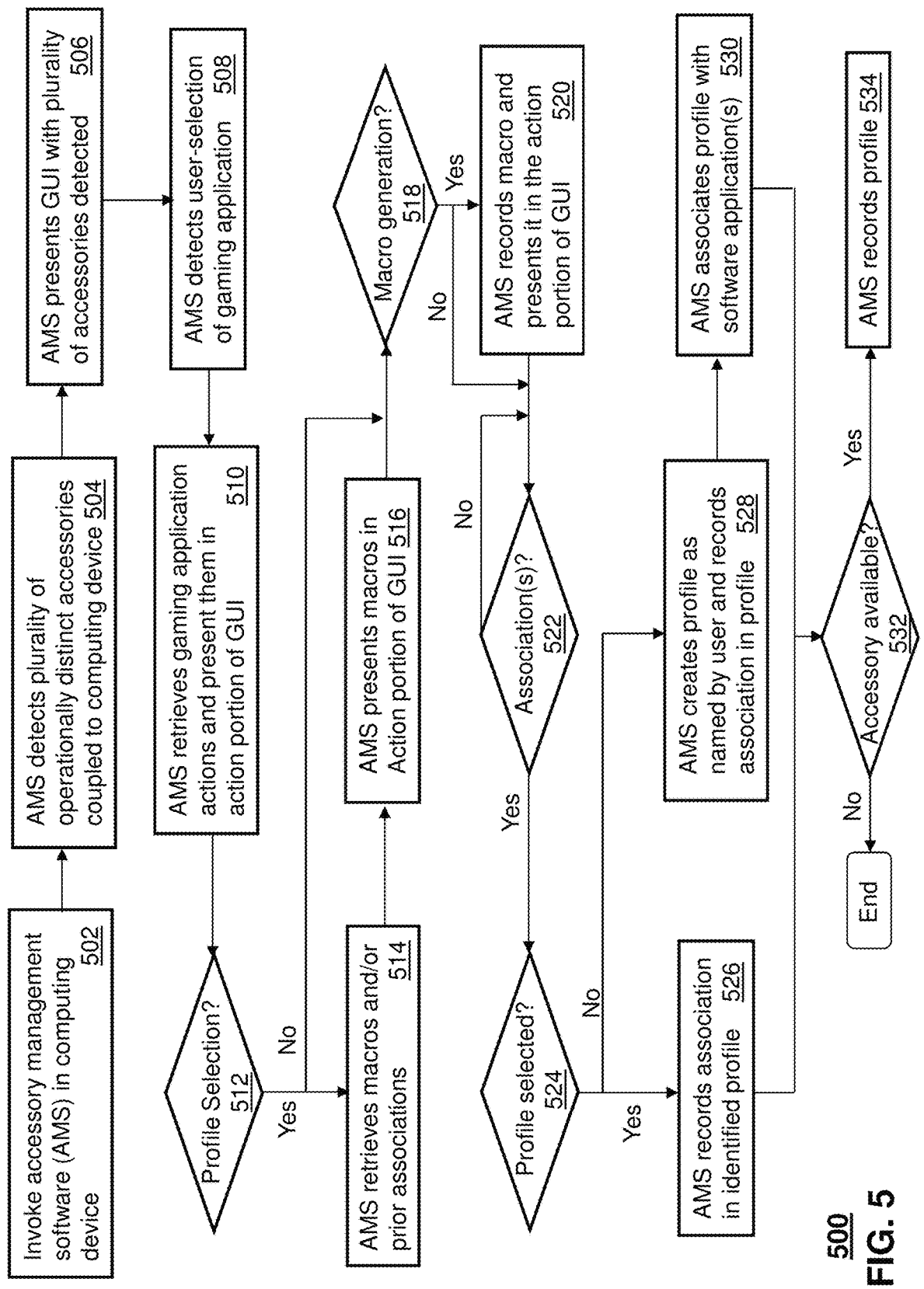
FIGS. 5, 6 and 7A-7E are flowcharts depicting methods describing illustrative embodiments of the subject disclosure.

FIG. 4 depicts an illustrative embodiment of a computing device 400. Computing device 400 can serve in whole or in part as an illustrative embodiment of the devices depicted in FIGS. 1-3. The computing device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as proprietary or other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the computing device 400. The keypad 408 can be an integral part of a housing assembly of the computing device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the computing device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the computing device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the computing device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the computing device 400 in three-dimensional space. The orientation sensor 420 can utilize orientation sensing technology such as a magnetometer to detect the orientation of the computing device 400 (North, South, West, East, combined orientations thereof in degrees, minutes, or other suitable orientation metrics).

The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the computing device 400 can include a reset button (not shown). The reset button can be used to reset the controller 406 of the computing device 400. In yet another embodiment, the computing device 400 can also include a factory default setting button positioned below a small hole in a housing assembly of the computing device 400 to force the computing device 400 to re-establish factory settings. In this embodiment, a user can use a protruding object such as a pen or paper clip tip to reach into the hole and depress the default setting button.

The computing device 400 as described herein can operate with more or fewer components described in FIG. 4 to accommodate the implementation of the devices described by the subject disclosure. These variant embodiments are contemplated by the subject disclosure.

FIGS. 5, 6 and 7A-E depict methods 500-700 describing illustrative embodiments of the AMS application. Method 500 can begin with step 502 in which the AMS application is invoked in a computing device. The computing device can be a remote server (not shown), the gaming console 206 of FIG. 2A, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 121 of the gaming controller 115. Thus, when the selected button is depressed, the stimulus signal that is generated by the selected button of the gaming controller 115 can be substituted by the AMS application with the Melee Attack action. In another embodiment, the Melee Attack action can be associated with a combination of key button presses (e.g., simultaneous depression of the left and right buttons 119, 121, or a sequence of button depressions: two rapid left button depressions followed by a right button depression).

In yet another embodiment, the Melee Attack action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state. Alternatively, the AMS application can determine a gaming venue state from information provided by a gaming application via an API as previously described.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 306) and programmable, the AMS application can proceed to step 534 of FIG. 5 where it submits the profile and its contents for storage in one of the accessories (e.g., the gaming controller 115 in FIGS. 2A and 3). Once the accessory, gaming controller, or combinations thereof are programmed with the profile, such devices can perform stimuli substitutions according to the associations recorded by the AMS application in the profile. Alternatively, the AMS application can store the profile in computing devices 206, 262, or 272 of FIGS. 2A-2B and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
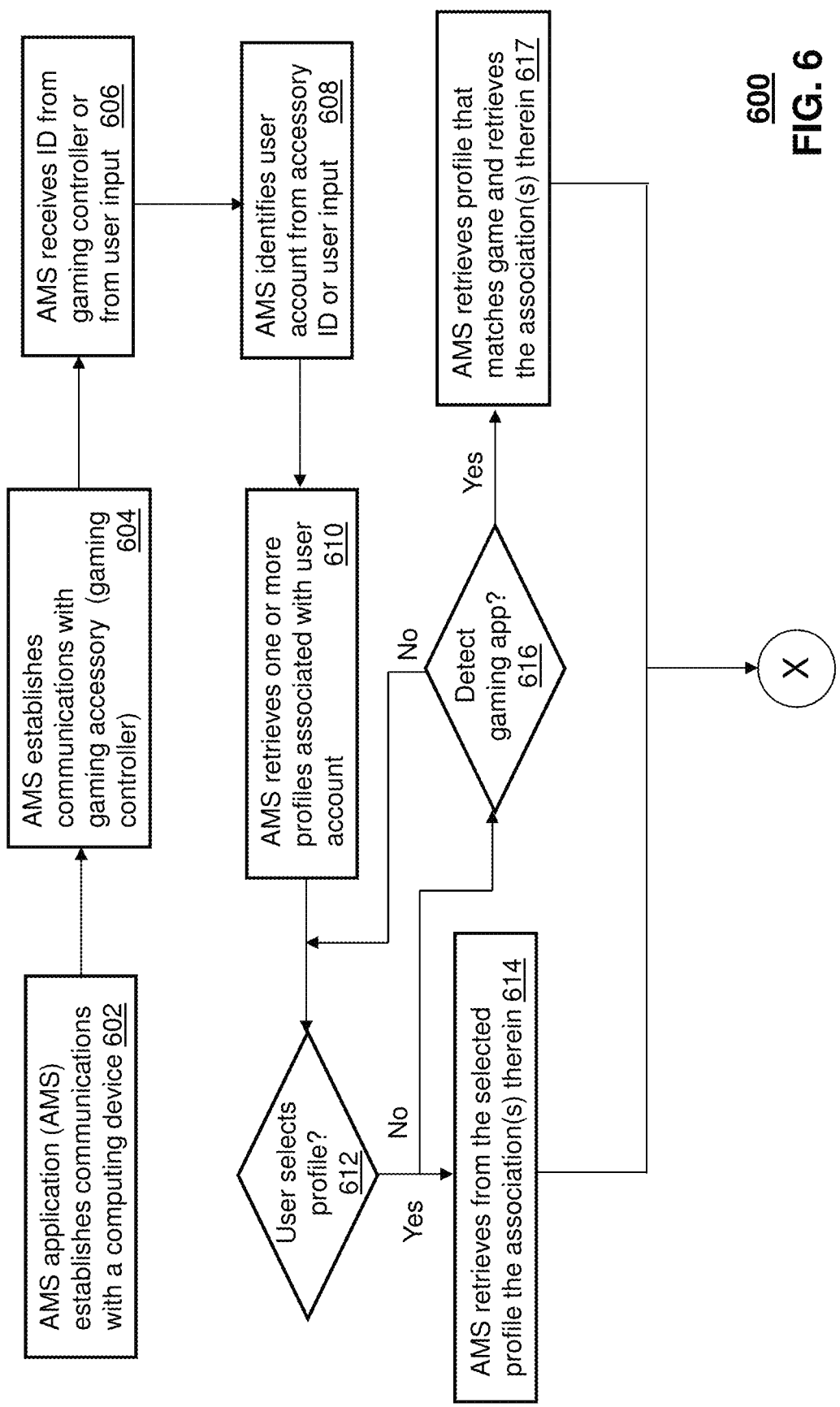

FIG. 6 depicts a method 600 for illustrating the operations of the AMS application for either of the configurations shown in FIGS. 2A-2B. In the configurations of FIGS. 2A and 2B, the AMS application can be operating in whole or in part from the gaming controller 115, the gaming console 206, the remote server 272, or a computing device such as the desktop computer 262. For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Figure 7A:
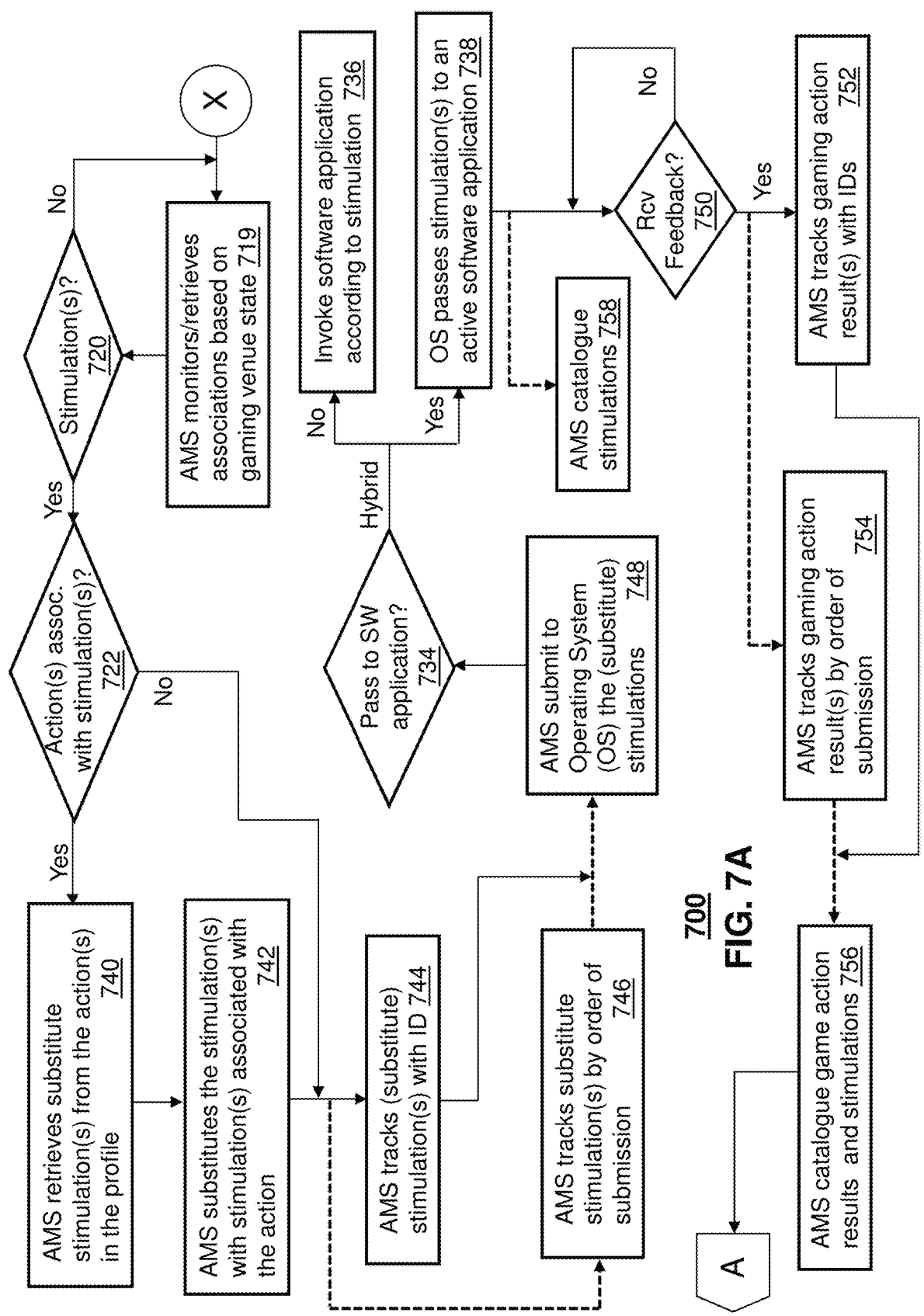
Figure 7B:
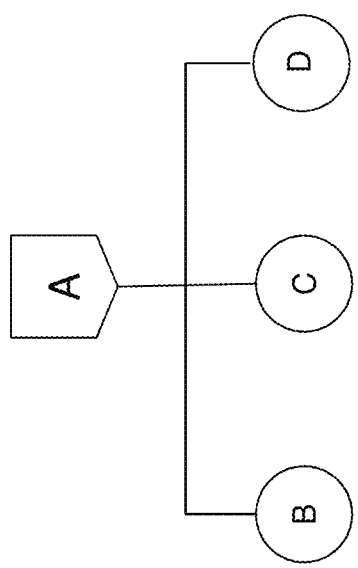

Once a profile and its contents have been retrieved in either of steps 614 or step 617, the AMS application can proceed to step 719 of FIG. 7A where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tank's movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

The AMS application can monitor in step 720 stimulations generated by the accessories coupled to the gaming console 206. The stimulations can be generated by the gamer by manipulating the gaming controller 115, and/or by generating speech commands detected by the headset 114. If a stimulation is detected at step 720, the AMS application can determine in step 722 whether to forward the detected stimulation(s) to an Operating System (OS) of the gaming console 206 without substitutions. This determination can be made by comparing the detected stimulation(s) to association in the profile. If the detected stimulation(s) match the associations, then the AMS application proceeds to step 740 where it retrieves substitute stimulation(s) in the profile. In step 742, the AMS application can substitute the detected stimulation(s) with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substitute stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations, the AMS application can proceed to step 748 and submit the substitute stimulations to the OS of the gaming console 206. If in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the gaming console 206 with or without tracking information as previously described.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738. For instance, suppose the stimulation sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 758. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

In accordance with embodiments of the subject disclosure, the gaming engine can provide training for game players, based on the stimulation(s) input by the player and the game action results (game feedback) returned from the gaming application via the API. Training for gamers may occur in various game environments, for example as schematically illustrated in FIGS. 7F-7H respectively. Some representative training procedures are illustrated in FIGS. 7C-7E respectively.

FIG. 7F shows an arrangement in which a gaming engine delivers a game experience to gamer 301 via a local computing device 705. In the embodiment shown in FIG. 7F, the local computing device 705 includes AMS 715 and API 725 and accordingly performs gaming engine functions. In this illustration, gamer 301 submits inputs (stimulations) 703 to the gaming engine using the gaming controller 115. It will be appreciated that gaming controller 115 is but one of a variety of gaming accessories, managed by AMS 715, that can be used by the gamer 301. The video game action is displayed on display device 231. Display device 231 can also present the game action results of inputs 703 that are returned from the game application via the API 725, and can also present messages for correcting and/or coaching the gamer, either in real time during the game or afterwards in a replay session. The gaming engine maintains a record of both the gamer's inputs and the game action results. It will be appreciated that all or part of the gaming engine functions may be performed at a remote server 272, interacting with the gamer's computing device 705 and accessories via network 270, or the gaming engine functions can be localized to the gamer's computing device 705 when on-line gaming is not being used.

Figure 7C:
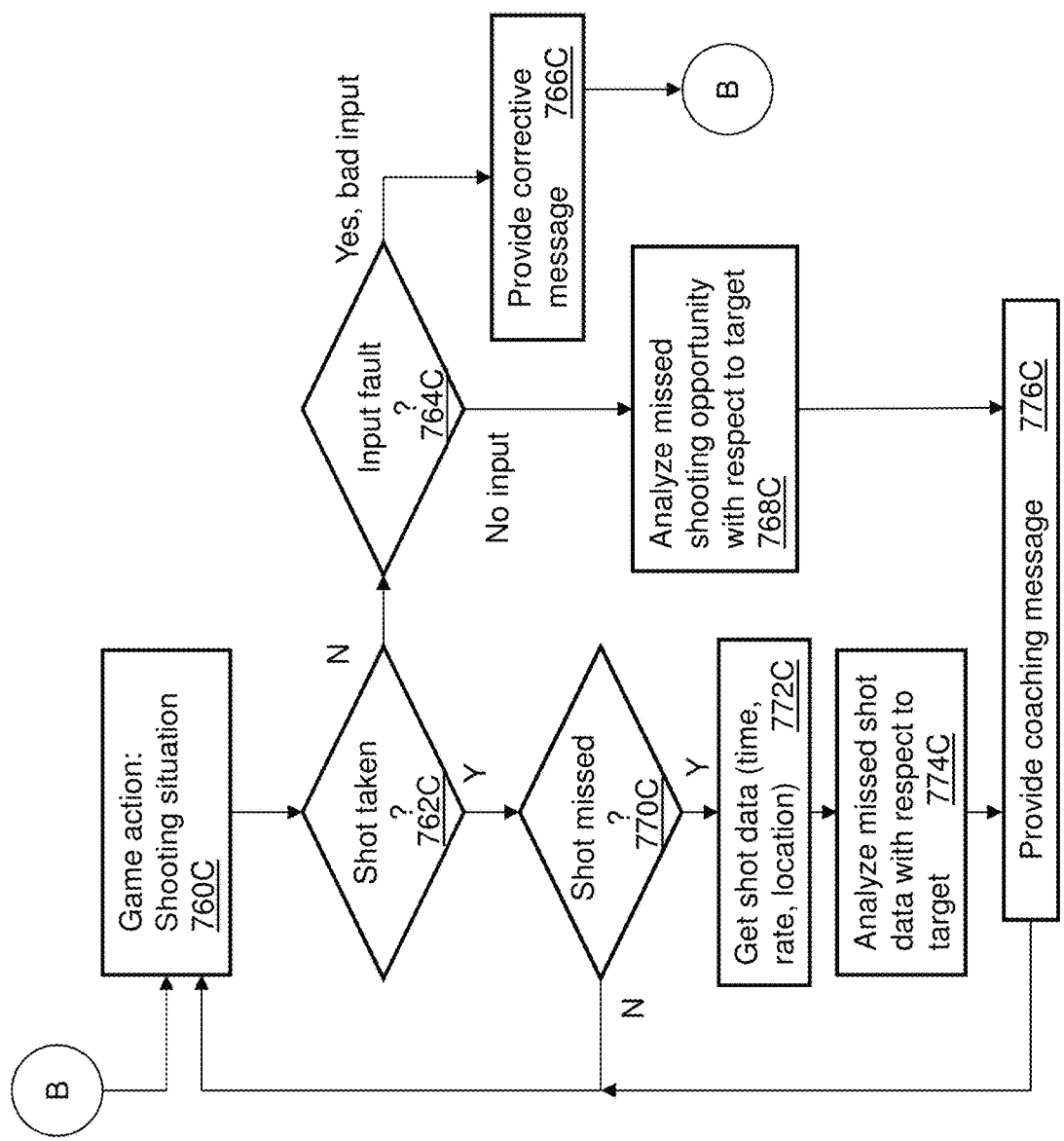
Figure 7D:
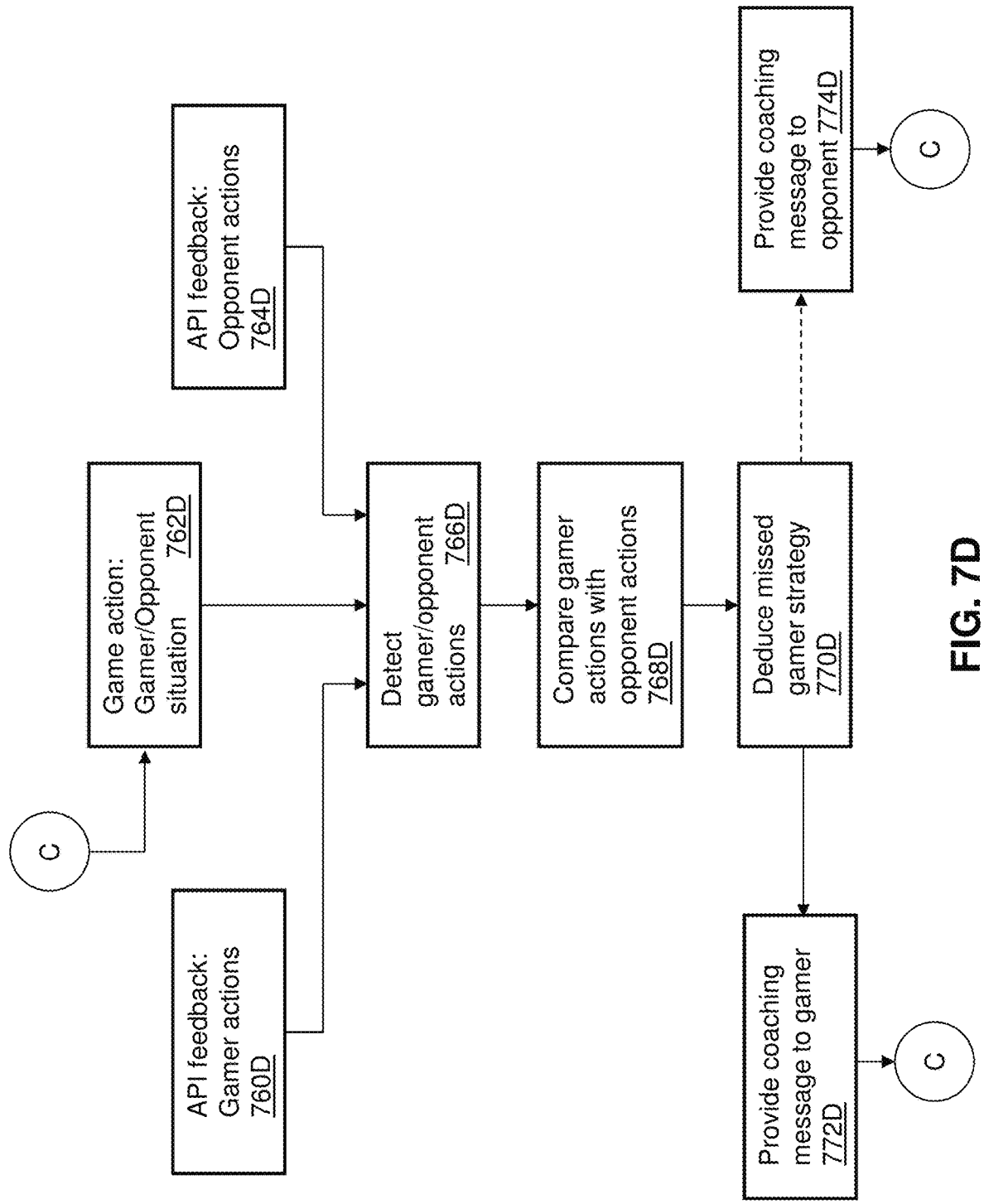
Figure 7E:
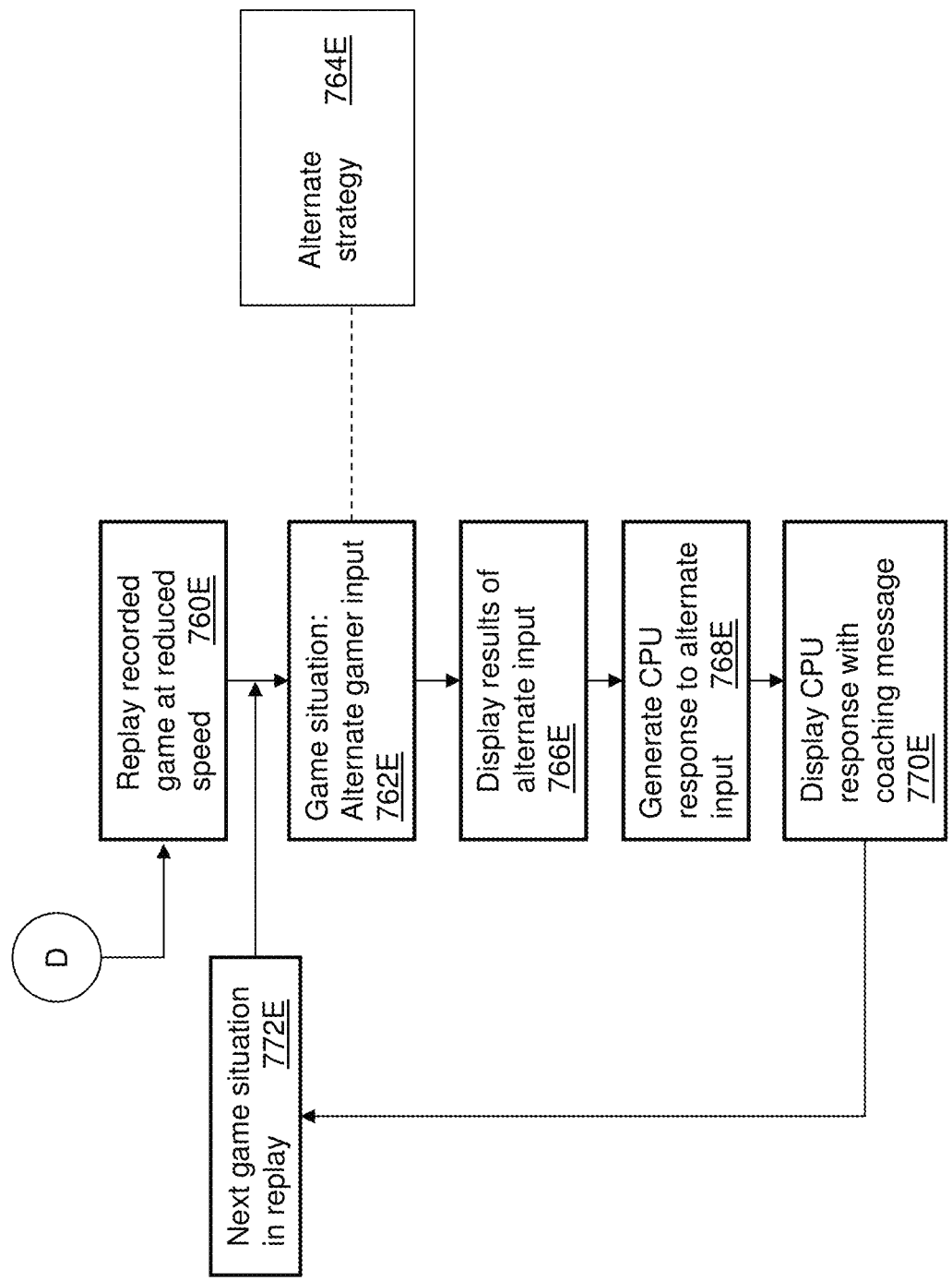
Figure 7F:
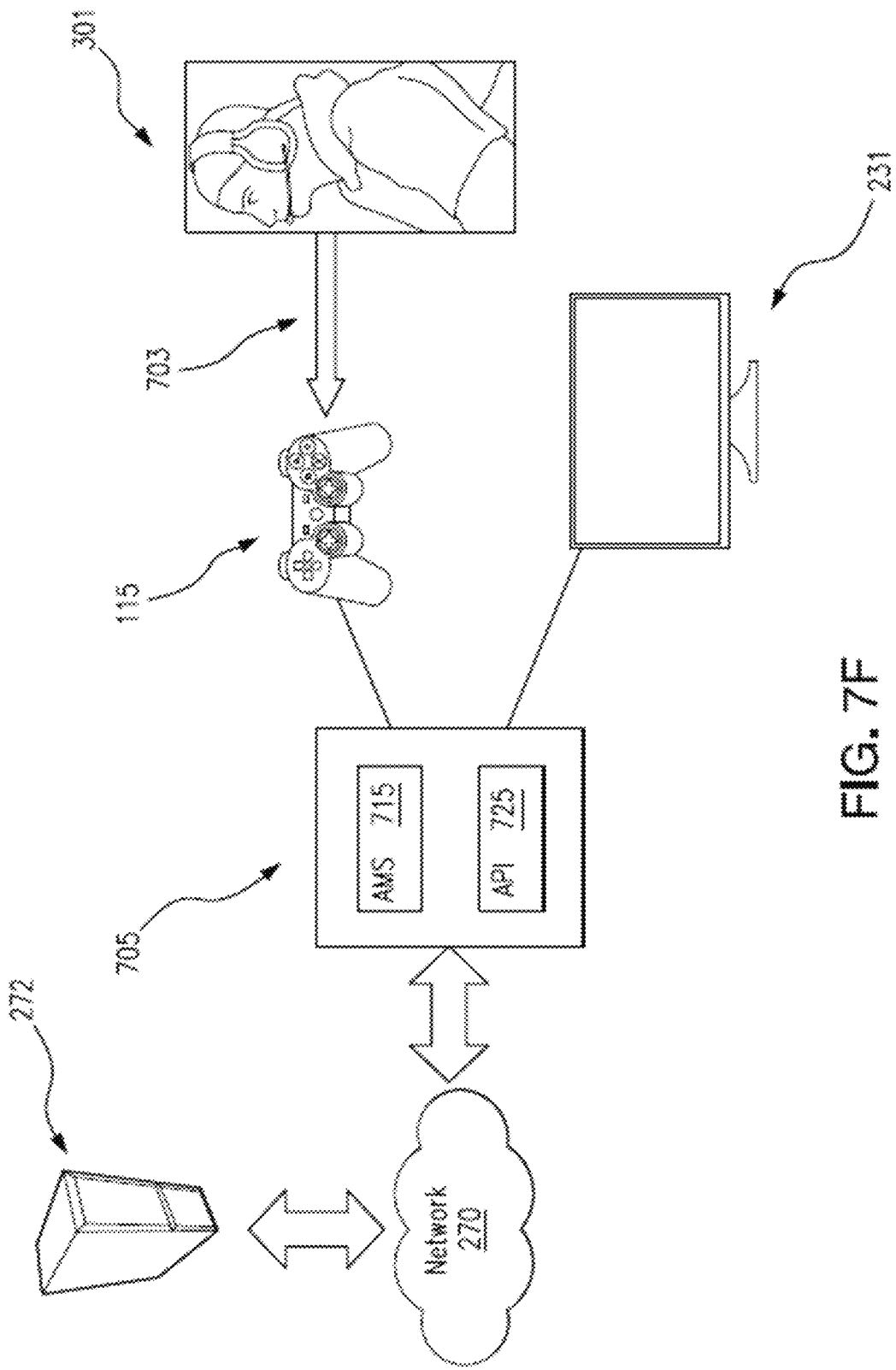
FIGS. 7F-7H schematically illustrate gaming environments for training a game player.
Figure 7G:
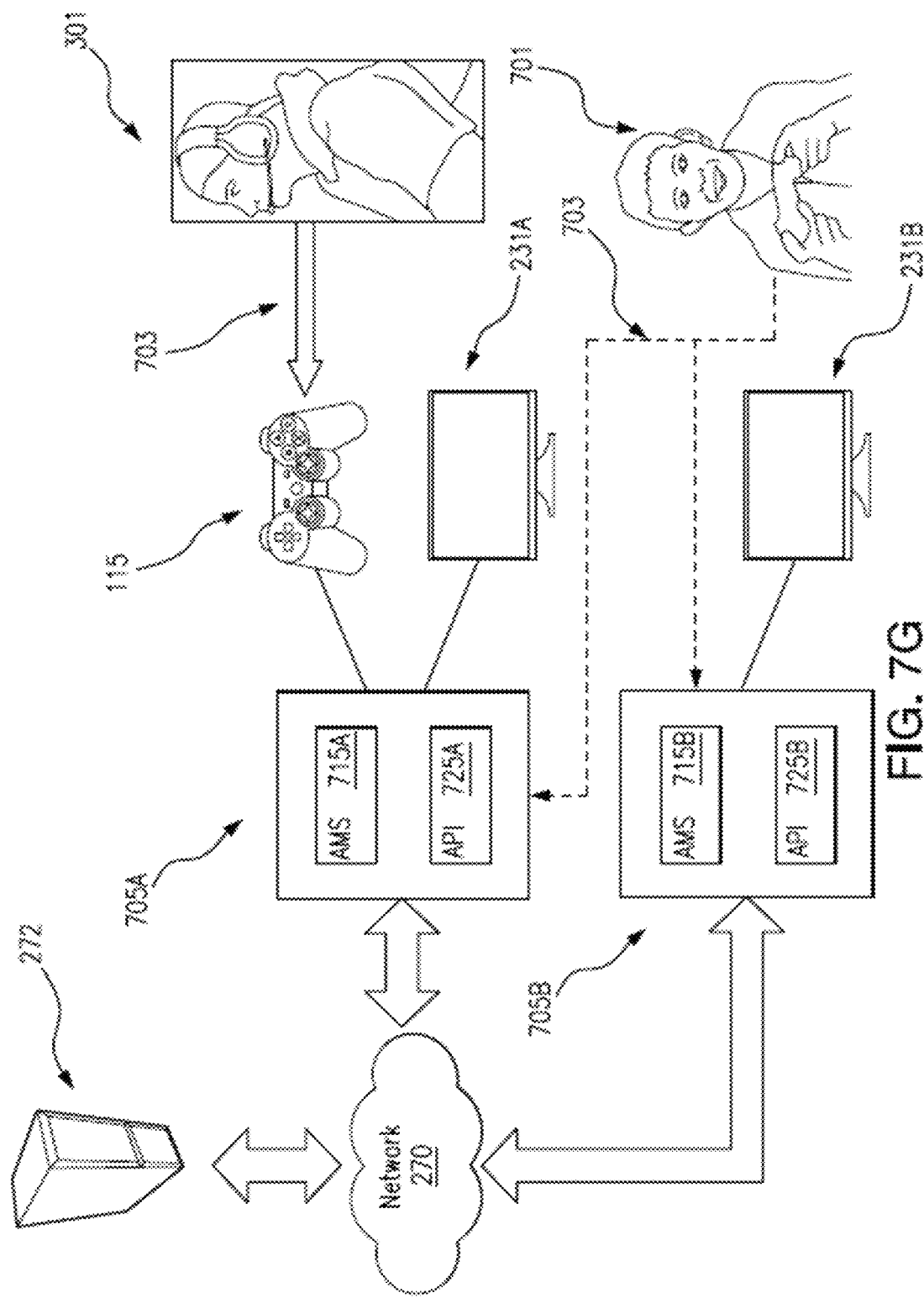
Figure 7H:
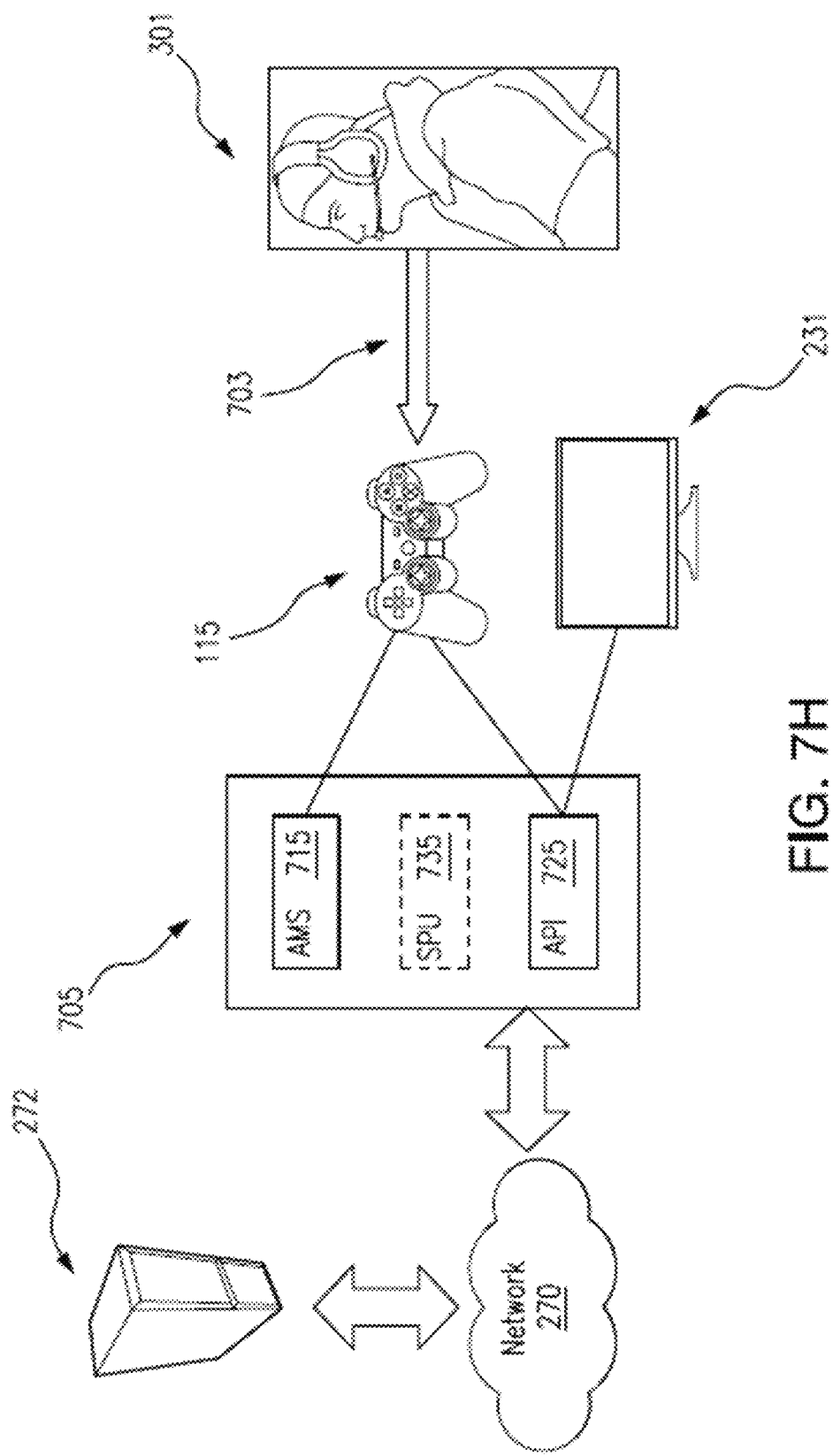

FIG. 7C shows a procedure for coaching a gamer presented with a game situation in which a shooting target is displayed (step 760C). The gaming engine detects (step 762C) whether the gamer took the shot. If the gamer did not, the gaming engine then detects (step 764C) whether the gamer made a faulty input (for example, accidentally hitting the letter "A" on the keyboard when "S" is the command to shoot). In the case of faulty input, the gaming engine can display a corrective message (step 766C) on display device 231. Alternatively, the gaming engine can play a prerecorded audio message or present the corrective message in some other fashion. If the gamer made no input (that is, missed the shooting opportunity, an undesirable result), the gaming engine can analyze (step 768C) the particular situation (for example, how clear a view the gamer had, how much time was available to take the shot, how much ammunition the gamer had available), and then proceed to provide a coaching message (step 776C) appropriate to that situation.

If the gamer took a shot but missed (step 770C), the gaming engine retrieves data regarding the shot (step 772C) from a gaming action result provided by the gaming application via the API, and performs further analysis (step 774C). For example, if the gamer took several shots that all missed the target in one direction, the gaming engine could infer a systematic aiming problem. However, if the gamer took several shots in a short time period that missed the target in random directions, the gaming engine could infer that the gamer had aimed too hastily. The gaming engine can then provide a coaching message (which can be displayed on device 231) for the gamer. A corrective message (step 766C) for achieving a desired result and a coaching message (step 776C) can be presented in real time (while the game is in progress) or after the game has concluded.

In another embodiment, the gaming engine can analyze a gamer's strategy by comparing that gamer's actions with those of an opponent. FIG. 7G shows an arrangement in which a gaming engine delivers a game experience to gamer 301 and to an opponent 701. In one embodiment, the game can be centralized, where both players 301, and 701 locally submit inputs to the same gaming engine via communication paths 703. The gaming engine may execute on computing device 705A, which is local to both gamers (in this illustration, gamers 301, 701). In another embodiment, the game can be centralized remotely, where both players 301, 701 submit inputs to a remote server via computing devices 705A and 705B coupled to network 270 respectively. In this configuration, a first portion of the video game is executed on server 272, while software client portions of the video game are executed on computing devices 705A and 705B, respectively. Alternatively, the game can be distributed, wherein each player interacts with a different gaming engine operating in computing devices 705A and 705B, respectively, or the gaming engines can be managed by the remote server 272, or combinations thereof. As shown in FIG. 7G, the opponent 701 can use a different gaming accessory to submit inputs 703. In this embodiment, gamer 301 employs a strategy for anticipating and responding to the opponent's actions.

FIG. 7D shows a procedure for analyzing a gamer's strategy based on the gamer's and the opponent's actions, and for coaching the gamer. The gaming engine detects a game situation (step 762D) in which the gamer 301 and opponent 701 encounter each other—that is, actions of either one can influence the actions of the other. In step 766D, the gaming engine detects the actions of the gamer and the opponent according to API feedback 760D relating to the gamer and API feedback 764D relating to the opponent. The gaming engine then compares the gamer actions with the opponent actions (step 768D), and then can deduce a missed strategy on the part of the gamer (step 770D). The gaming engine can then provide a coaching message regarding the gamer's strategy (step 772D). Steps 762D-772D can be repeated for each game situation involving the gamer's strategy with respect to the opponent.

In a further embodiment, the gaming engine can also provide results of the opponent's actions and analyze the opponent's actions to detect missed strategies on the part of the opponent (step 770D) and provide a coaching message regarding the opponent's strategy (step 774D). The coaching message accordingly can provide advice to both the gamer and the opponent. The coaching message can be presented in real time (while the game is in progress) or after the game has concluded on display devices viewable by the gamer and the opponent respectively.

In another embodiment, the gaming engine can record all or portions of a gaming session and provide coaching by replaying the game and permitting a gamer to experience results of alternative inputs (that is, alternative actions). For example, the gaming engine can enable a gamer to replay, pause, forward, rewind, and/or select between scenes in a recorded gaming session.

FIG. 7H shows an arrangement where a live opponent is replaced by a simulated opponent in the form of a simulated processing unit or SPU 735. SPU 735 can react to various alternate actions by gamer 301. By reviewing the SPU's reactions, the gamer can see the effects of alternate strategies.

FIG. 7E shows a procedure for coaching a gamer by permitting the gamer to experience the results of different alternative strategies. In step 760E, the game (or a portion of the game with a sequence of situations) is recorded and replayed at a reduced speed. The gamer accordingly can review his actions in the various game situations. Inputs by other players participating in the recorded game can also be included in the replay.

The gaming engine thus guides the gamer through the game, with the gamer having the opportunity to test alternate strategies and actions in the various game situations. In each situation, the gamer can input an alternate stimulus (step 762E) and then view the alternate results (step 766E). The alternate stimulus can be input in accordance with an alternate strategy 764E designed by the gamer or suggested by the gaming engine. Furthermore, the SPU can react to the various alternative inputs in each situation. The responses of the SPU to the alternative inputs are generated (step 768E)

and displayed along with a coaching message (step 770E) relating to the effectiveness of the strategy being tested. The gamer can test alternate strategies in succeeding game situations (step 772E).

It will be appreciated that a wide variety of coaching messages may be provided in the above-described procedures (such as in step 776C in FIG. 7C, steps 772D and 774D in FIG. 7D, and step 770E in FIG. 7E). A coaching message may be understood as any message to a gamer that the gamer can use to improve his/her performance and/or enjoyment of the game. As a non-limiting example, a coaching message can be a graphical display instead of or in addition to a text message delivered to the gamer. A coaching message can also be based on synthesized audible speech. The audible speech can be supplied to the gamer's headset or played on speakers of the gaming system.

In one embodiment, a graphical display of a coaching message can comprise a comparison of actual vs. ideal play in a game situation. In an embodiment, when a game is replayed as in the procedure of FIG. 7E, two sequences of game situations may be displayed in windows side-by-side: 1) the game action as it actually occurred, and 2) the game action as it could have occurred had the gamer used a better strategy or executed with greater skill ("ideal strategy," "best play," or "best practices"). The gamer can use various trick-play functions (e.g. fast-forward, rewind, stop action, variable play speed, etc.) on each window, either simultaneously or independently, to study the differences between the actual play and best play.

The coaching message can be provided in real-time during a gaming session as text messages and/or audible speech; for example:

"Slow down your shooting, you're low on ammo";
"Your aim is off, switch to a sniper rifle or add a scope to your weapon to better your aim";
And so on.

Audible and/or text coaching messages can also be provided during post-game analysis; for example:

"Your rapid fire in the replay portion of the game that you are viewing in the left window led to a rapid loss of ammo which provided the enemy an advantage";
"The right window shows a simulated replay illustrating what the result might have been if you slowed your firing rate by 50%";
"In this new scene, you used a shot gun, when a machine gun would have been more effective";
And so on.

In another embodiment, the two windows (actual-play and best-play) can be displayed with an overlay on each window or just one of the two windows. The overlay can show a trajectory of a projectile shot by a weapon of an avatar controlled by the gamer and the projectile's final destination. To highlight the trajectory, the overlay can, for example, display a dotted line that extends from the egress point of a weapon to the projectile's final destination. The overlay can be shown on both windows to illustrate to a gamer how far off a projectile was from hitting a target. The trick play functions (e.g., slow play) can be used to draw the overlay slowly; that is, slow draw the dotted line extending from the egress point of the weapon to its destination to create a better visual effect for the gamer.

Other embodiments are contemplated for coaching messages. For example, in a team setting, the coaching message can be directed to more than one gamer. For example, a coaching message can be sent to two gamers indicating that their game performance would improve if they moved to a vehicle with one gamer driving and the other gamer manning a weapon in the vehicle. The coaching message in this illustration can also indicate which gamer would perform better as the driver and which gamer would perform better as the shooter based on a past performance history of each gamer. The coaching messages can be conveyed as audible speech directed to each gamer's headset and/or as text messages sent to each gamer's display device.

Figure 8:
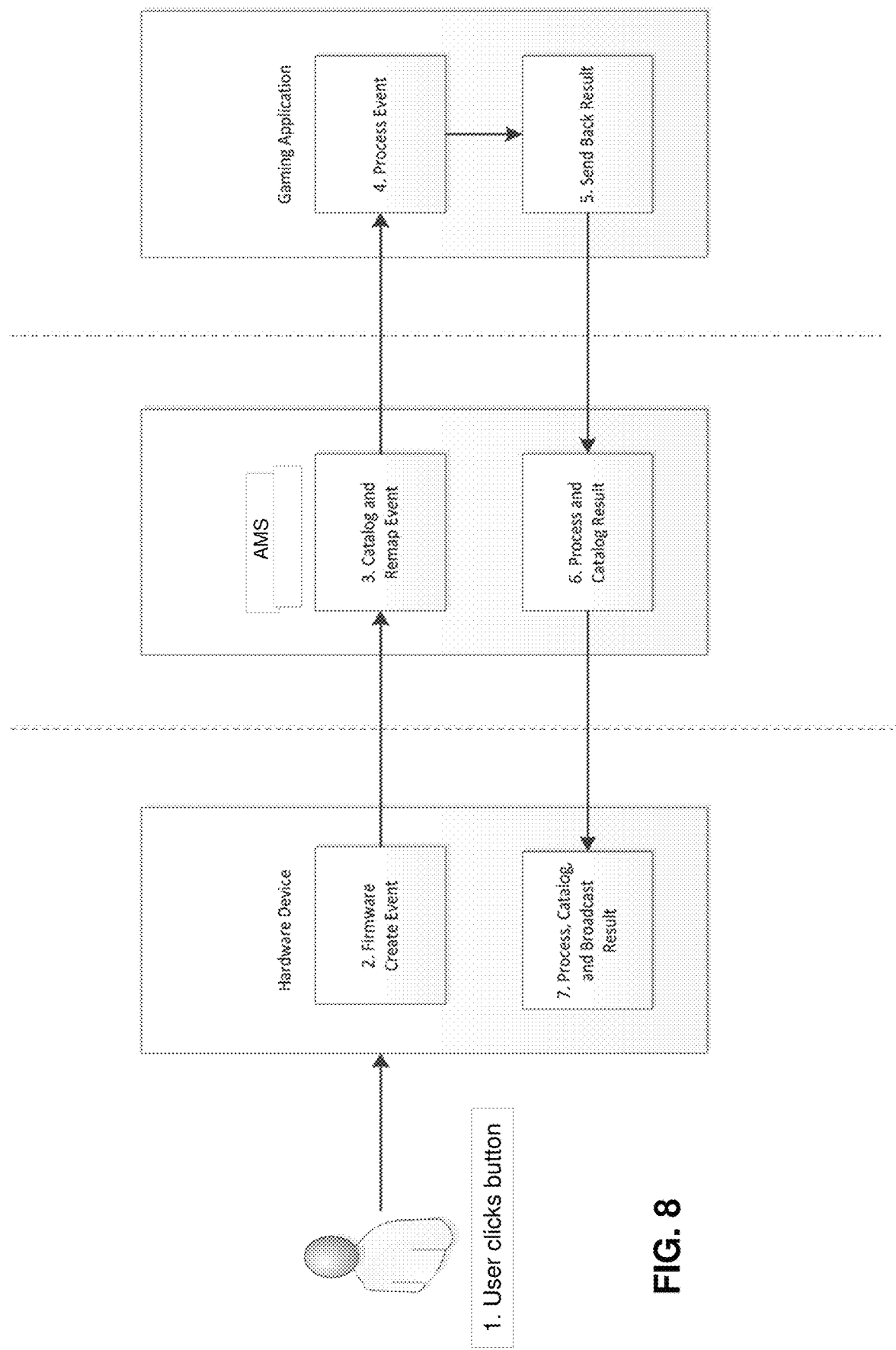
FIG. 8 depicts an illustrative embodiment of a system operating at least in part according to the methods of FIGS. 5, 6, and 7A-7E.
Figure 9:
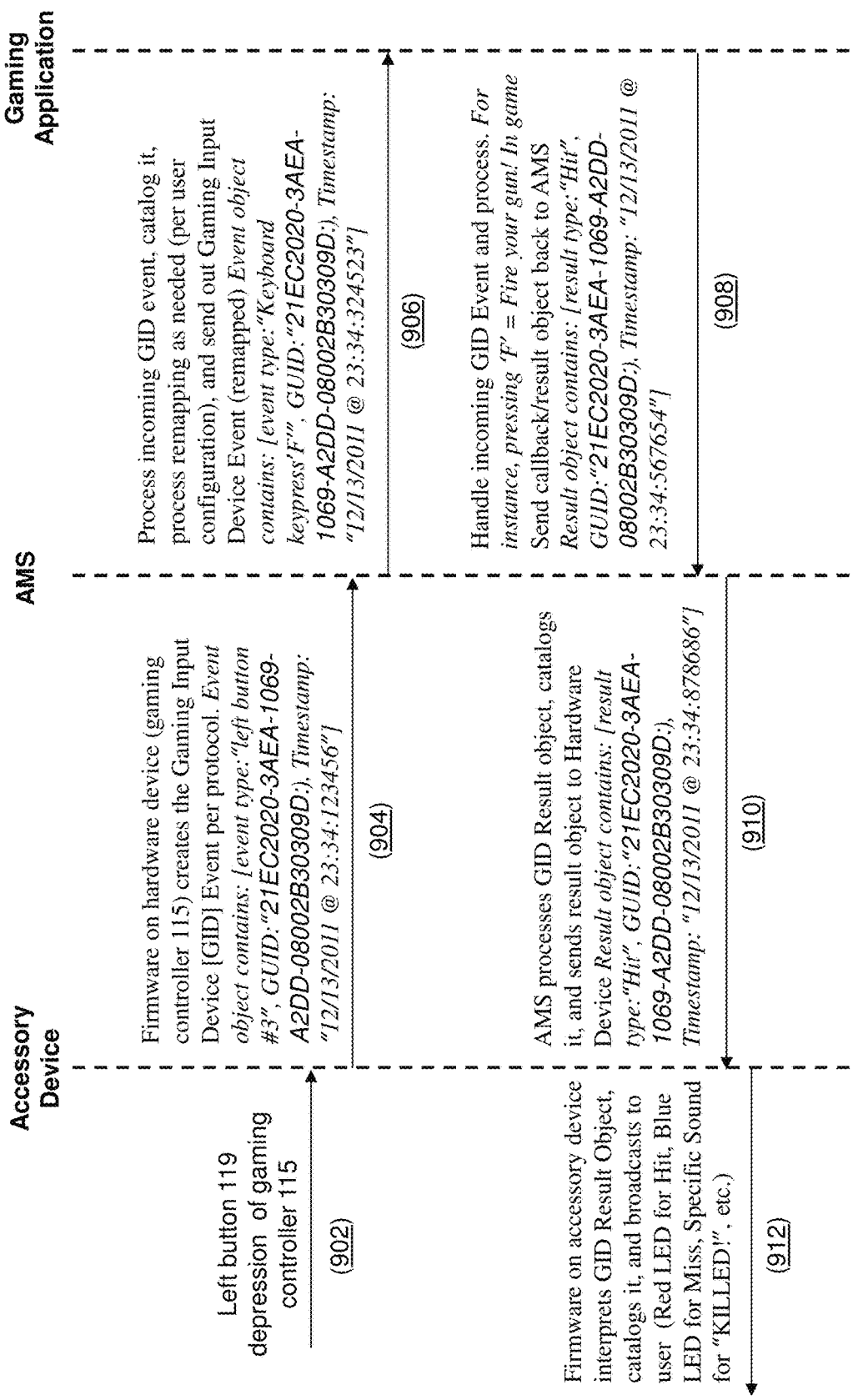
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue results as shown in FIGS. 11-14. The presentation of the catalogued results can be based on a live session, or a replay session when reviewing segments of a video game much like a replay session of a sporting event (e.g., football game) is analyzed by sports analysts. To assist the audience in viewing a competition between gamers, the AMS application can be adapted to present a virtual peripheral representative of the accessory of each gamer as shown in FIGS. 11-14.

Figure 10:
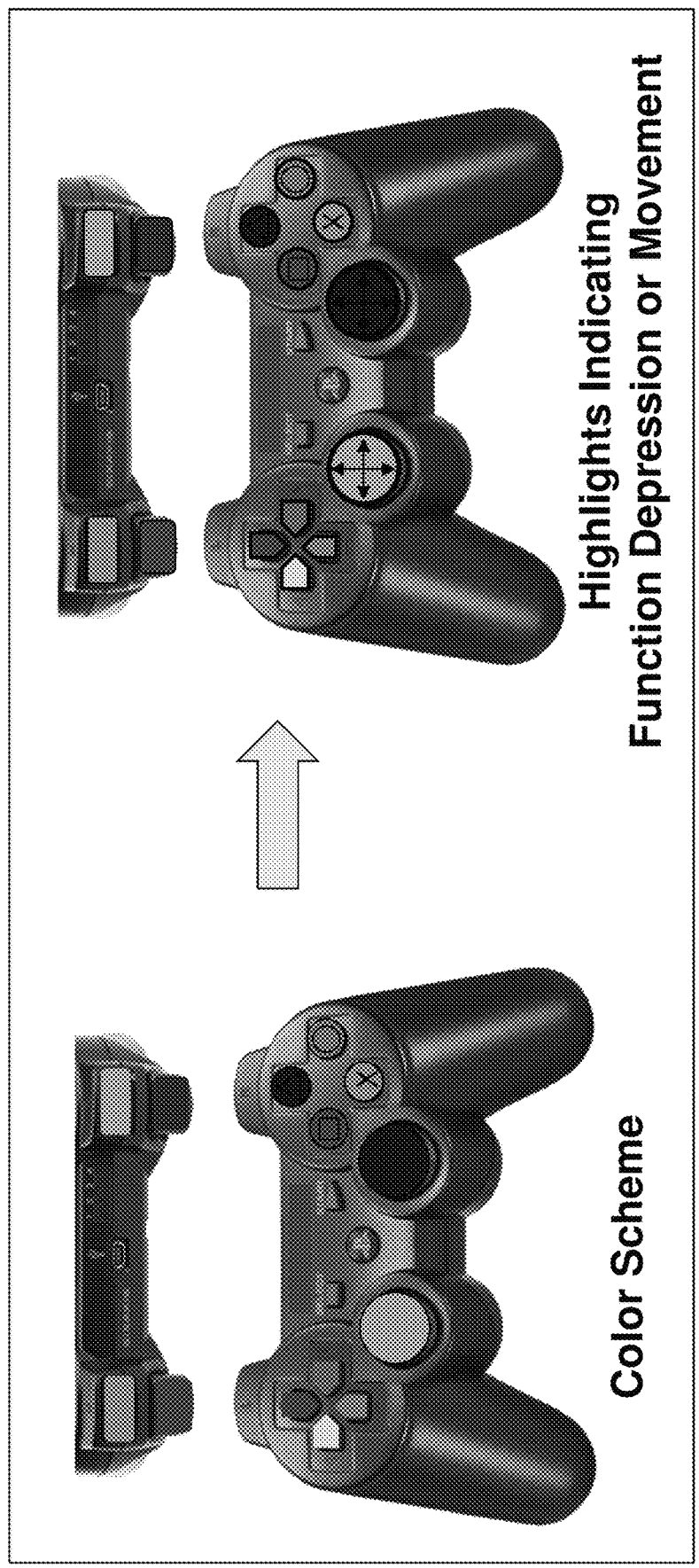
FIG. 10 depicts an illustrative embodiment for highlighting functions of an accessory.

The AMS application can be adapted to use coloring and highlight schemes to indicate when a function (e.g., a button or navigation knob) of the peripheral is being used as shown in FIG. 10. For example, the color code "dark red" can represent a button or knob that is frequently in use, while a color code of "dark blue" can represent a button or knob that is infrequently used. To indicate when a button or knob is in use, the button or knob can be highlighted with a white outline while the unused buttons can remain un-highlighted. In the case of knobs, which can be moved Omni directionally, the AMS application can show movements of a highlighted knob as the gamer is utilizing the knob based on the stimulations received by the AMS application.

For example, if a gamer moves a knob in a northwest direction, the knob is highlighted with a white outline, and the knob is shown moving in the direction chosen by the gamer. As buttons are being depressed and released rapidly, the AMS application will present rapid transitioning between the enabling and disabling of highlights to indicate the speed that the gamer is depressing and releasing the buttons. As the frequency of depressions of buttons or use of knobs increases, the AMS application will change the color code of the buttons or knobs as described above to signify frequency of use of the buttons and knobs.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Figure 12:
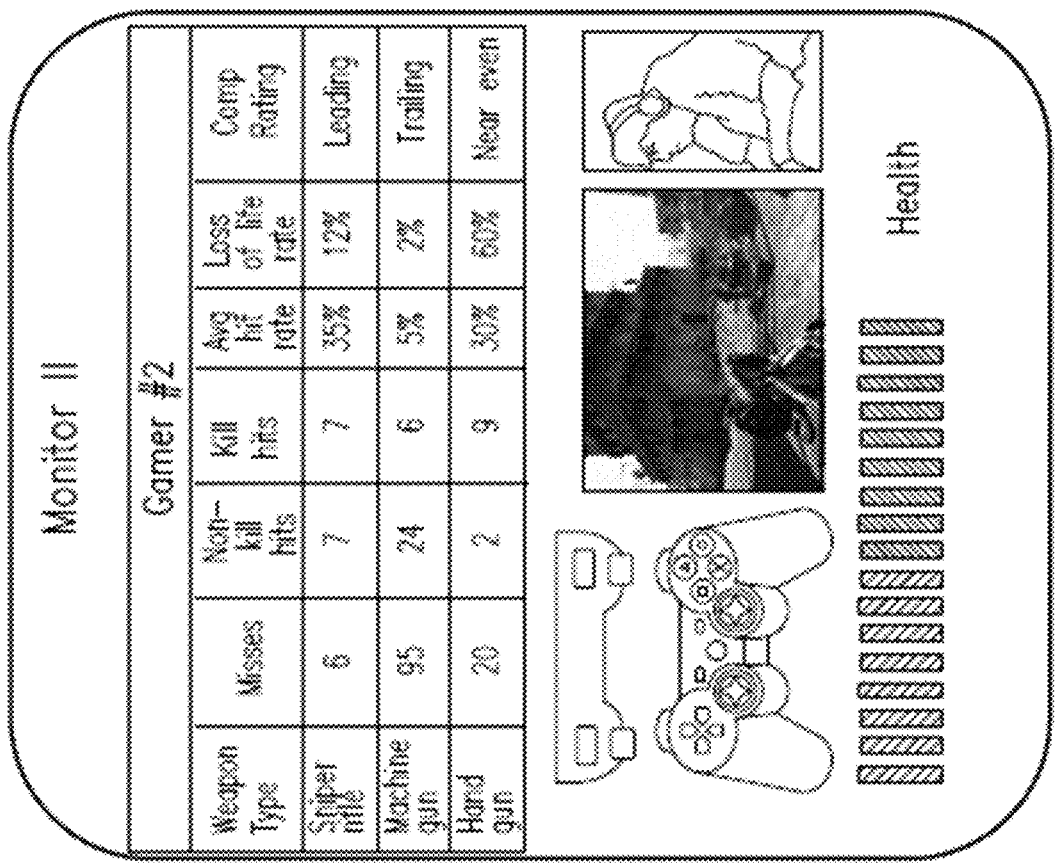
FIGS. 11-14 depict illustrative embodiments for presenting performances of gamers.
Figure 11:
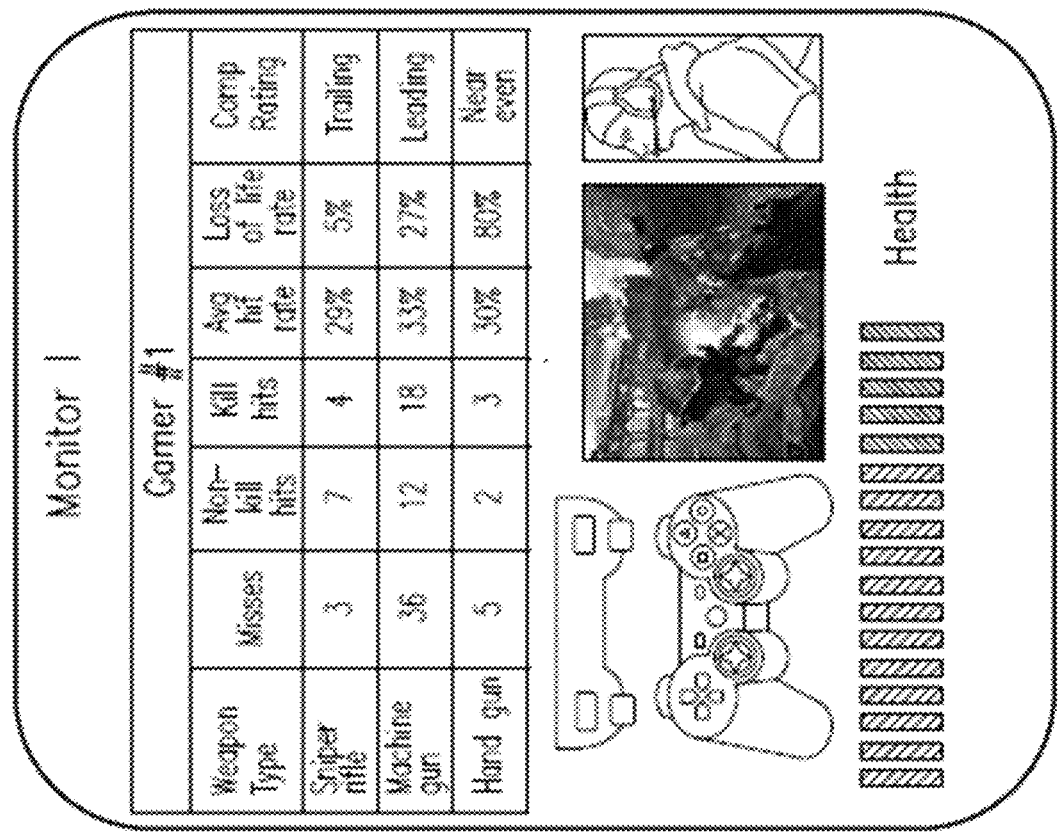

The AMS application can present performance factors of each gamer, and the type of weapons being tracked (e.g., sniper rifle, machine gun, hand gun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 11-12.

Figure 14:
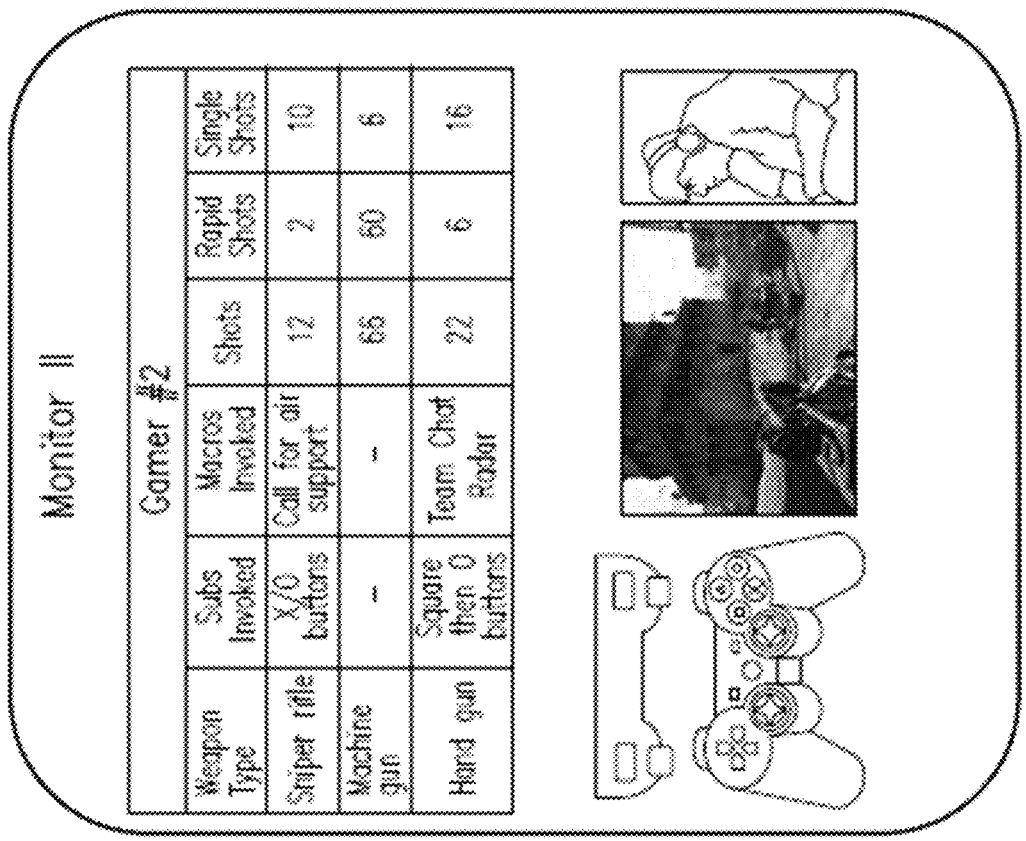
Figure 13:
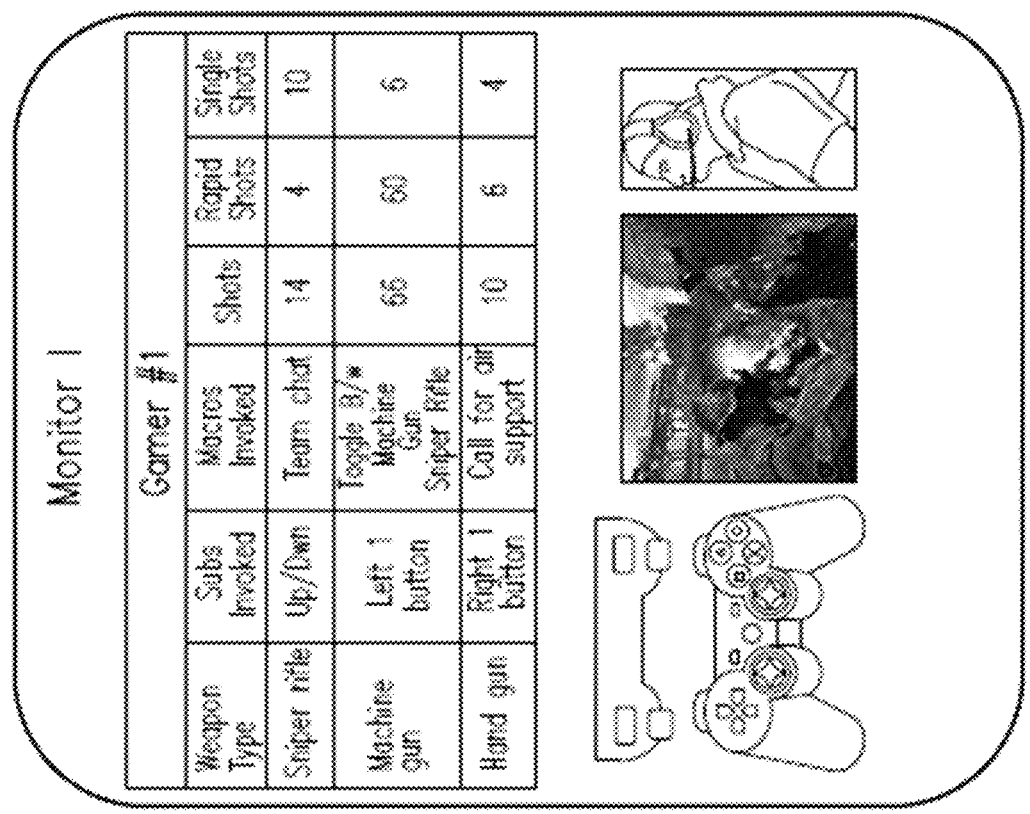

In an embodiment where the gaming application does not provide gaming action results (e.g., the video gaming application does not provide an API), the AMS application can be adapted to present a gamer's performance based on the stimulus signals generated, and where applicable, the substitute stimulus signals submitted to the gaming application as shown in FIGS. 13-14. In this illustration, the virtual peripherals are shown with the color scheme and highlights discussed earlier. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimuli generated by the AMS application to return to the sniper rifle. A depression of the right "1" button by gamer #1 resulted in substitute stimuli generated by the AMS application to call for air support. Gamer #2 shows that s/he has not invoked a substitute stimuli for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

Although not shown, monitoring stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

From the foregoing descriptions, it would be evident to an artisan with ordinary skill in the art that the aforementioned embodiments can be modified, reduced, or enhanced without departing from the scope and spirit of the claims described below.

For instance, the AMS application can record stimulus signals and/or gaming results for a game session and store this data for an extended period of time for each of a plurality of gamers. In addition, the AMS application can store multiple recorded game sessions for each gamer and can be adapted to compare a history of game sessions to assess how each gamer's performance has evolved. Each gamer's improvement or degradation detected by the AMS application over a number of gaming sessions can be reported to the gamer and/or other gamers as progression line charts, histograms, pie charts or other suitable presentation methods. The results can also be reported in a gaming tournament, on-line games, or other suitable setting in a manner similar to the illustrations of FIGS. 11-14.

The AMS application can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application, or the AMS application may apply this embodiment automatically in instances where the AMS application does not receive gaming action results from the gaming application due to a lack of an API or other suitable interface to receive gaming action results from the gaming application. Performance can also mean a comparison of only gaming action results and not stimulus signals, which can also be a user-selectable feature presented by a GUI generated by the AMS application. Performance can further represent a combination of gaming action results and stimulus signals with similar data of other recorded gaming sessions. In sum, a gamer's performance can be determined from stimulus signals (with or without substitute stimulus signals), and/or gaming action results in whole or on part monitored by the AMS application.

For any one of the foregoing embodiments, the AMS application can detect improvements or degradations in performance between a present tournament game and the previously recorded tournament game and report the results to the gamer and/or an audience of on-line gamers or a public audience at a tournament via the monitors of FIGS. 11-14. The foregoing embodiments can be applied in a private setting (i.e., only visible to the gamer) and/or a social network of gamers who share and present results via the AMS application or a social network such as FaceBook™ or other suitable social network platform.

In yet another embodiment, the AMS application can be adapted to compare a gamer's performance to another gamer's recorded performance. In a tournament setting, for example, the gamers' performance can be compared to each other based on the present gaming session or prior recorded sessions of the other gamer. In one embodiment, the AMS application can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by the AMS application can be locally stored on a gamer's computing device (e.g., desktop computer or gaming console) or on a remote server managed by a service provider of the AMS application or by a service provider that provides "Cloud" storing services. Comparison results can similarly be stored on a gamer's local computing device or a remote server.

In yet another embodiment, the AMS application can be adapted to alert users when a particular gamer has achieved certain performance criteria established by another gamer. For instance, the AMS application can present a GUI to a gamer to identify performance criteria of interest (e.g., number of kill hits, average hit rate for a particular weapon, a particular ranking of a gamer for a particular gaming application, etc.). The identified performance criteria can be monitored by the AMS application for the selected gamer and when one or more criteria have been achieved by the monitored gamer, the AMS application can alert the interested user by suitable communication means such as email, short messaging system (SMS) text message, or a GUI of the AMS application when the interested user is engaging the AMS application.

In another embodiment, the AMS application can compare the performance of the gamers to a community rating localized to users of the gaming console 206, or all or a portion of on-line users which can span a large community of users of the gaming application. For example, although an average hit rate of 5% for a sniper rifle may seem low for gamer #1 in FIG. 11, when these statistics are compared to other members of a community (e.g., other professional players), the AMS application can determine from prior performance records of members of the community (retrieved from a local or remote database) that the user's performance is in fact above average. Similar community comparisons can be performed for the weapon type "machine gun" and "hand gun". The AMS application can also monitor and track statistics of other gaming applications which may have different weapon types. Similar statistics can be generated and compared to the performance of members of a community to which the gamer is associated.

In one embodiment, the statistical results shown in FIGS. 11-14 can be used to identify behavioral and/or skill patterns of a gamer. For instance, suppose a gamer appears to perform well as a sniper in one gaming application and bow and arrow marksman in a different gaming application. The AMS application can be adapted to detect these correlations to indicate a skill set of the gamer that may be consistent between different games. For example, a sniper and bowman have a similar trait that requires marksmanship, calm nerves, and knowing when to strike. This trait can be identified by the AMS application and can be used to identify other games in which the gamer may perform well. This trait can also be advertised to other gamers to promote teams.

The above-described methods can be adapted to operate in whole or in part in a gaming accessory, in an operating system of a computer, in a gaming console, in a gaming application that generates the video game, or any other suitable software application and/or device.

The method of FIG. 7A can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) for a macro comprising a combination of substitute stimuli, and track the macro when gaming action results are received from the gaming application rather than track each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 11-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the subject disclosure.

The foregoing embodiments are a subset of possible embodiments contemplated by the subject disclosure. Other suitable modifications can be applied to the subject disclosure.

Figure 15:
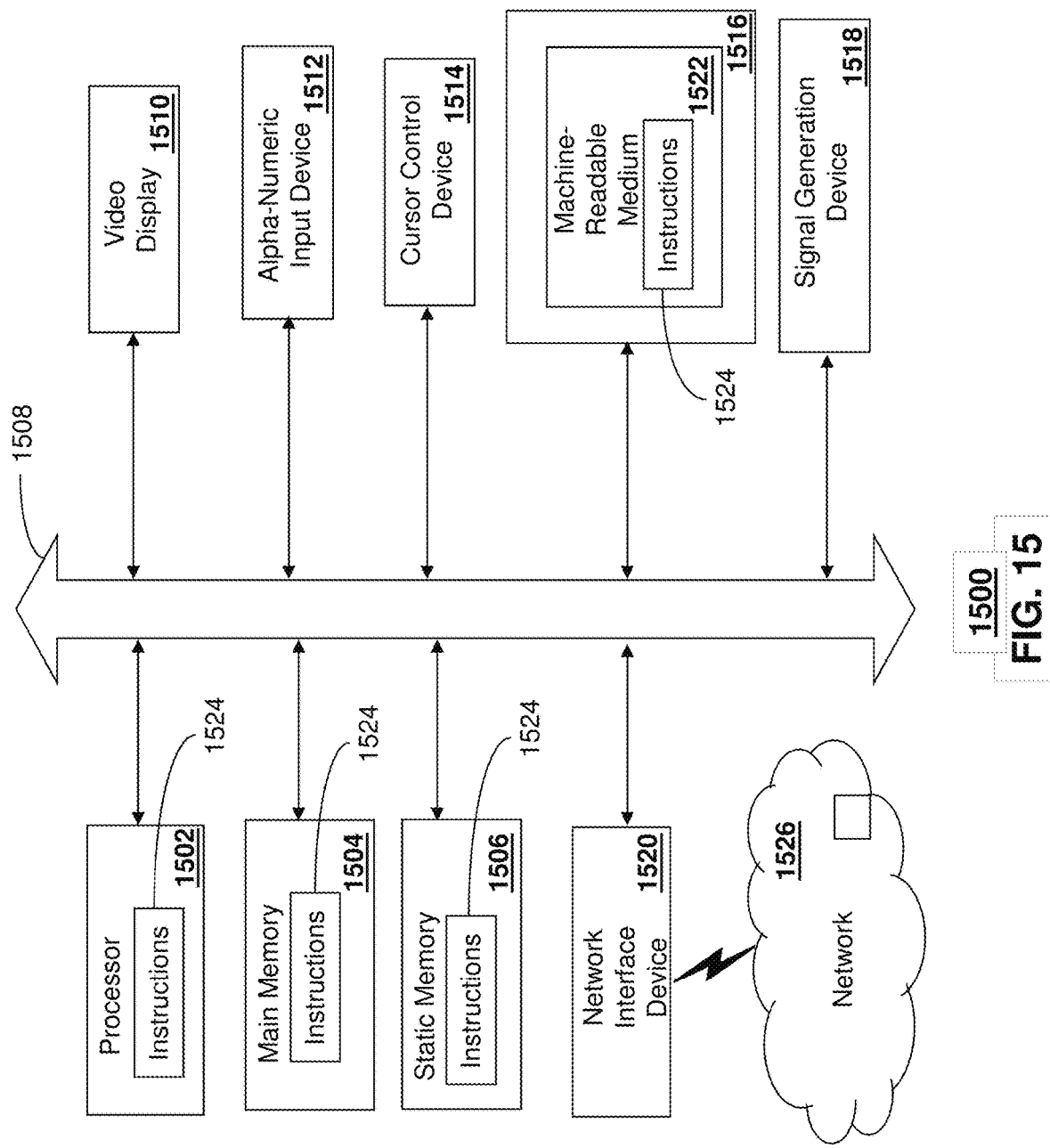
FIG. 15 depicts an illustrative diagrammatic representation of a machine in the form of a computer system within which a set of instructions, when executed, may cause the machine to perform any one or more of the methodologies disclosed herein.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   executing, by a computing device comprising a processing system including a processor, a video game generated by a video game software application;
   presenting an image representing a game situation of the video game generated by the video game software application;
   determining, by the computing device, a gaming venue state of the video game by performing image processing on the image representing the game situation of the video game;
   detecting, by the computing device, a first game stimulus signal from a first gaming accessory device controlled by a first game user and a second game stimulus signal from a second gaming accessory device controlled by a second game user;
   substituting, by the computing device, a first substitute game stimulation signal for the first game stimulus signal according to the gaming venue state of the video game;
   generating, by the computing device, a first game action result according to the first substitute game stimulation signal;
   generating, by the computing device, a second game action result according to the second game stimulus signal;
   comparing, by the computing device, the first game action result and the second game action result;
   generating, by the computing device, a first coaching message based on the comparing; and
   presenting, by the computing device, the first coaching message.

2. The method of claim 1, wherein the gaming venue state has associated therewith a first desired result.

3. The method of claim 2, wherein the comparing comprises:
   determining, by the computing device, whether the first game action result failed to achieve the first desired result; and
   analyzing, by the computing device, the first game action result responsive to determining that the first game action result failed to achieve the first desired result.

4. The method of claim 2, wherein the comparing further comprises:
   determining, by the computing device, whether the second game action result failed to achieve the first desired result; and
   analyzing, by the computing device, the second game action result responsive to determining that the second game action result failed to achieve the first desired result.

5. The method of claim 1, further comprising retrieving first data relating to the first game action result and second data relating to a second game action result.

6. The method of claim 1, wherein the second game user comprises a simulated processing unit, wherein the gaming venue state comprises an encounter between the first game user and the simulated processing unit, and wherein the second game action result is further generated based on an action by the simulated processing unit.

7. The method of claim 1, wherein the first coaching message is presented to the first game user and further comprising presenting, by the computing device, a second coaching message to the second game user.

8. The method of claim 1, further comprising retrieving, by the computing device, first data relating to the first game action result, wherein the first data comprises a time of occurrence of the first game stimulus signal, a frequency of use of the first game stimulus signal, a location in the gaming venue state affected by the first substitute game stimulation signal, a trajectory of an object initiated by the first substitute game stimulation signal, or any combination thereof.

9. The method of claim 1, further comprising:
   recording at least a first portion of a first session of the video game where the first substitute game stimulation signal did not cause a first desired result; and
   generating a second portion of a second session of the video game according to a third game stimulus signal which, if generated by the first gaming accessory device, would cause the first desired result, wherein the presenting of the first coaching message further comprises presenting, by the computing device, one of the first portion of the first session of the video game, the second portion of the second session of the video game, or both.

10. The method of claim 9, further comprising presenting, by the computing device, selectable functions to enable pausing, forwarding, rewinding, skipping, or scene selection of one of the first portion of the first session of the video game, the second portion of the second session of the video game or both, or any combination thereof.

11. A non-transitory, machine-readable storage device comprising instructions, which when executed by a processing system including a processor, cause the processing system to perform operations comprising:
   executing a video game generated by a video game software application;
   presenting an image representing a game situation of the video game generated by the video game software application;
   determining a gaming venue state of the game situation of the video game by performing image processing on the image representing the game situation of the video game;
   detecting a first game stimulus signal from a first gaming accessory device controlled by a first game user and a second game stimulus signal from a second gaming accessory device controlled by a second game user;
   substituting a first substitute game stimulation signal for the first game stimulus signal according to the gaming venue state of the game situation of the video game;
   generating a first game action result according to the first substitute game stimulation signal;
   generating a second game action result according to the second game stimulus signal;
   comparing the first game action result and the second game action result;
   generating a first coaching message based on the comparing; and
   presenting the first coaching message.

12. The non-transitory, machine-readable storage device of claim 11, wherein the image comprises a target, wherein the game situation has associated therewith a first desired result corresponding to hitting the target, and wherein the comparing further comprises:
   determining whether the first game action result failed to achieve the first desired result; and
   analyzing the first game action result responsive to determining that the first game action result failed to achieve the first desired result.

13. The non-transitory, machine-readable storage device of claim 11, wherein the operations further comprise:
   presenting the first coaching message to the first game user if the first game action result failed to achieve a first desired result.

14. The non-transitory, machine-readable storage device of claim 11 wherein the comparing comprises:
   comparing the first game action result and the second game action result to determine a first missed strategy of the first game user and a second missed strategy of the second game user; and
   wherein presenting the first coaching message comprises presenting a first game user coaching message to the first game user responsive to the first missed strategy and presenting a second game user coaching message to the second game user responsive to the second missed strategy.

15. The non-transitory, machine-readable storage device of claim 11 wherein presenting the first coaching message comprises presenting a graphical display or a text message, or both, on a display device viewable by the first game user.

16. The non-transitory, machine-readable storage device of claim 11 wherein presenting the first coaching message comprises presenting synthesized audible speech to speakers audible by the first game user or the second game user or both.

17. A computing device, comprising:
   a memory to store computer instructions; and
   a processing system including a processor coupled to the memory, wherein when executing the computer instructions, the processing system performs operations, comprising:
   executing a video game generated by a video game software application;
   detecting a first game stimulus signal from a first gaming accessory device controlled by a first game user and a second game stimulus signal from a second gaming accessory device controlled by a second game user;
   presenting an image representing a game situation of the video game; and
   determining a gaming venue state of the game situation by performing image processing on the image representing the game situation;
   substituting a first substitute game stimulation signal for the first game stimulus signal according to the gaming venue state of the video game;
   generating a first game action result according to the first substitute game stimulation signal;
   generating a second game action result according to the second game stimulus signal; and
   presenting a first coaching message based on the first game action result, the second game action result, or both.

18. The computing device of claim 17, wherein the presenting the first coaching message comprises presenting the first coaching message to the first game user if the first game action result failed to achieve a first desired result.

19. The computing device of claim 17, wherein the presenting the first coaching message comprises presenting the first coaching message as text messages or audible speech, or both, in real time during the executing a video game.

20. The computing device of claim 17, further comprising presenting a second coaching message to the second game user.

* * * * *